US012615604B2

(12) United States Patent
Dimou

(10) Patent No.:   US 12,615,604 B2
(45) Date of Patent:      Apr. 28, 2026

(54) UPLINK RESOURCE MAPPING FOR SIMPLIFIED SYNCHRONIZATION SIGNAL BLOCK CELLS

(71) Applicant: QUALCOMM Incorporated, San Diego, CA (US)

(72) Inventor: Konstantinos Dimou, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 18/153,987

(22) Filed: Jan. 12, 2023

(65) Prior Publication Data

US 2024/0244549 A1      Jul. 18, 2024

(51) Int. Cl.
*H04W 56/00*          (2009.01)
*H04W 76/20*          (2018.01)

(52) U.S. Cl.
CPC ....... *H04W 56/0015* (2013.01); *H04W 76/20* (2018.02)

(58) Field of Classification Search
CPC .......................... H04W 56/0015; H04W 76/20
See application file for complete search history.

(56) References Cited

U.S. PATENT DOCUMENTS 11,019,504 B2      5/2021   Zhang et al.
2019/0313260 A1*   10/2019  Zhang ............... H04W 74/0833

FOREIGN PATENT DOCUMENTS

| CN | 114095979 | A | * | 2/2022 | .......... H04W 36/302 |
| CN | 119138033 | A | * | 12/2024 | |
| TW | 202143783 | A | * | 11/2021 | ........ H04W 74/0833 |
| WO | 2019195376 | A1 | | 10/2019 | |
| WO | WO-2021069083 | A1 | * | 4/2021 | ........ H04W 56/0015 |
| WO | WO-2024028480 | A1 | * | 2/2024 | |

OTHER PUBLICATIONS

"3rd Generation Partnership Project; Technical Specification Group Radio Access Network; Study on network energy savings for NR (Release 18)"; 2022; pp. 1-72; 3GPP TR 38.864 V0.5.0 (Nov. 2022); Technical Report; 3GPP Organizational Partners.
Huawei, Hisilicon; "Remaining issues for carrier phase positioning"; R1-2210903; 3GPP TSG-RAN WG1 Meeting #111; Nov. 14-18, 2022; 33 pages; Toulouse, France.
Qualcomm Incorporated; "NW energy savings performance evaluation"; 3GPP TSG RAN WG1 #111; R1-2212128; Nov. 14-18, 2022; 10 pages; Toulouse, France.
3GPP TR 38.864: "3rd Generation Partnership Project, Technical Specification Group Radio Access Network, Study on Network Energy Savings for NR (Release 18)", Technical Report, 3GPP, Mobile Competence Centre, 650, Route Des Lucioles, F-06921 Sophia-Antipolis Cedex, France, No. V1.0.0, Dec. 5, 2022, pp. 1-70, XP052234536, pp. 24, Paragraph 6.1.3.1.
International Search Report and Written Opinion—PCT/US2024/010700—ISA/EPO—Apr. 4, 2024.

* cited by examiner

*Primary Examiner* — Saad A. Waqas
(74) *Attorney, Agent, or Firm* — Harrity & Harrity, LLP/QUALCOMM Incorporated

(57) ABSTRACT

Various aspects of the present disclosure generally relate to wireless communication. In some aspects, an apparatus may receive a simplified synchronization signal block (SSB). The apparatus may transmit an uplink communication using an uplink resource associated with an identifier indicated by the simplified SSB. Numerous other aspects are described.

36 Claims, 22 Drawing Sheets

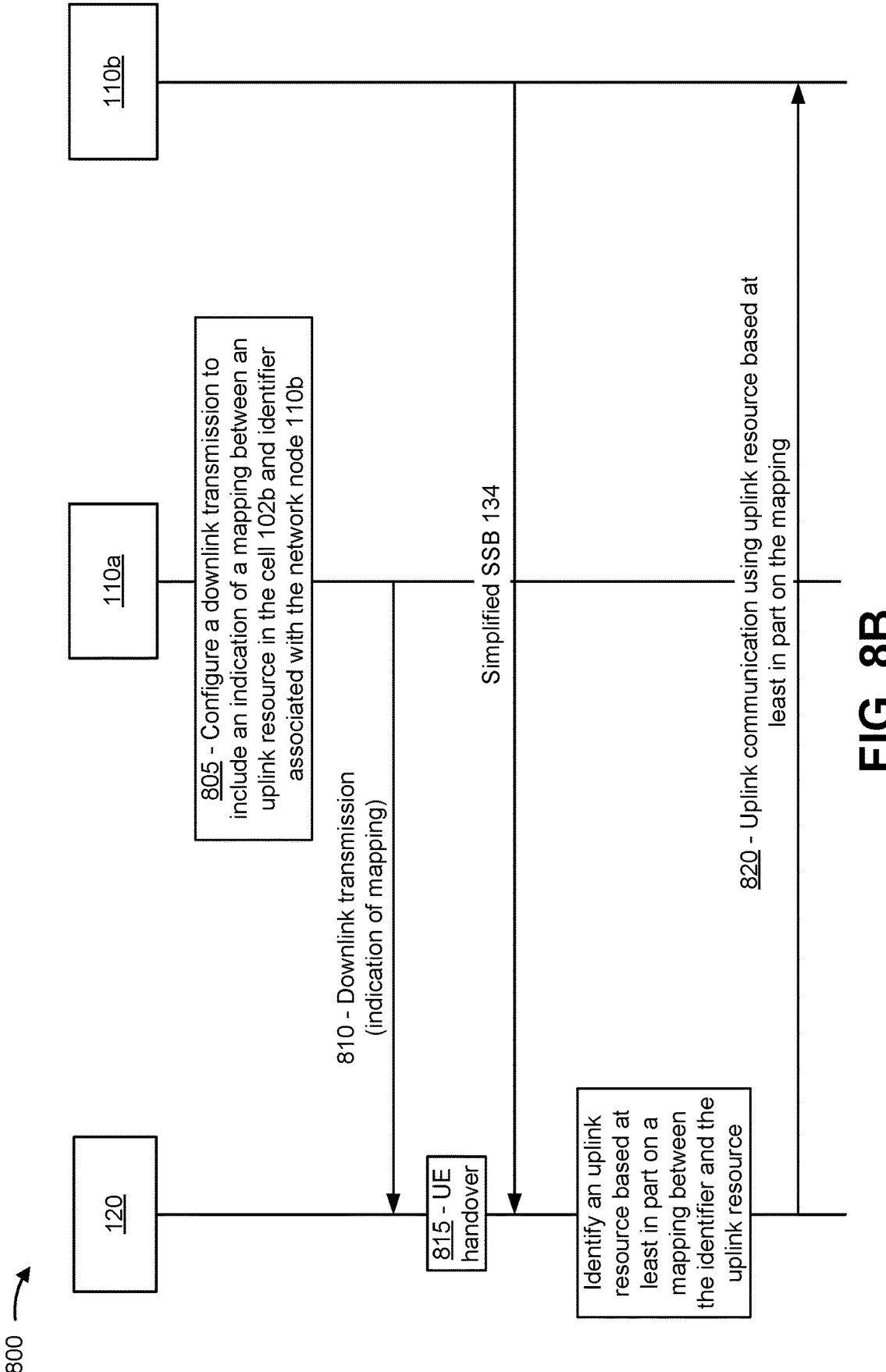

805 - Configure a downlink transmission to include an indication of a mapping between an uplink resource in the cell 102b and identifier associated with the network node 110b 110a 110b 810 - Downlink transmission (indication of mapping)

Simplified SSB 134

815 - UE handover

120

Identify an uplink resource based at least in part on a mapping between the identifier and the uplink resource 820 - Uplink communication using uplink resource based at least in part on the mapping

Transmit a simplified synchronization signal block (SSB)

Receive an uplink communication on an uplink resource associated with an identifier indicated by the simplified SSB

1010

1020

1000

1110 — Configure a downlink transmission to include an indication of a mapping between an uplink resource and an identifier associated with a second network node 1120 — Transmit the downlink transmission in a cell of the first network node

1100

1500

UPLINK RESOURCE MAPPING FOR SIMPLIFIED SYNCHRONIZATION SIGNAL BLOCK CELLS

Aspects of the present disclosure generally relate to wireless communication and to techniques and apparatuses for uplink resource mapping.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication. The apparatus may include a memory and one or more processors coupled to the memory. The one or more processors may be configured to receive a simplified synchronization signal block (SSB). The one or more processors may be configured to transmit an uplink communication using an uplink resource associated with an identifier indicated by the simplified SSB.

Some aspects described herein relate to an apparatus for wireless communication. The apparatus may include a memory and one or more processors coupled to the memory. The one or more processors may be configured to transmit a simplified SSB. The one or more processors may be configured to receive an uplink communication on an uplink resource associated with an identifier indicated by the simplified SSB.

Some aspects described herein relate to a first apparatus for wireless communication. The apparatus may include a memory and one or more processors coupled to the memory. The one or more processors may be configured to configure a downlink transmission to include an indication of a mapping between an uplink resource and an identifier associated with a second apparatus. The one or more processors may be configured to transmit the downlink transmission in a cell of the first apparatus.

Some aspects described herein relate to a non-transitory computer-readable medium that stores a set of instructions for wireless communication by an apparatus. The set of instructions may include one or more instructions that, when executed by one or more processors of the apparatus, cause the apparatus to receive a simplified SSB. The set of instructions may include one or more instructions that, when executed by one or more processors of the apparatus, cause the apparatus to transmit an uplink communication using an uplink resource associated with an identifier indicated by the simplified SSB.

Some aspects described herein relate to a non-transitory computer-readable medium that stores a set of instructions for wireless communication by an apparatus. The set of instructions may include one or more instructions that, when executed by one or more processors of the apparatus, cause the apparatus to transmit a simplified SSB. The set of instructions, when executed by one or more processors of the apparatus, cause the apparatus to receive an uplink communication on an uplink resource associated with an identifier indicated by the simplified SSB.

Some aspects described herein relate to a non-transitory computer-readable medium that stores a set of instructions for wireless communication by a first apparatus. The set of instructions, when executed by one or more processors of the first apparatus, cause the first apparatus to configure a downlink transmission to include an indication of a mapping between an uplink resource and an identifier associated with a second apparatus. The set of instructions, when executed by one or more processors of the first apparatus, cause the first apparatus to transmit the downlink transmission in a cell of the first apparatus.

Some aspects described herein relate to an apparatus for wireless communication. The apparatus may include means for receiving a simplified SSB. The apparatus may include means for transmitting an uplink communication using an uplink resource associated with an identifier indicated by the simplified SSB.

Some aspects described herein relate to an apparatus for wireless communication. The apparatus may include means for transmitting a simplified SSB. The apparatus may include means for receiving an uplink communication on an uplink resource associated with an identifier indicated by the simplified SSB.

Some aspects described herein relate to a first apparatus for wireless communication. The first apparatus may include means for configuring a downlink transmission to include an indication of a mapping between an uplink resource and an identifier associated with a second apparatus. The first apparatus may include means for transmitting the downlink transmission in a cell of the first apparatus.

Some aspects described herein relate to a method of wireless communication performed by an apparatus. The method may include receiving a simplified SSB. The method may include transmitting an uplink communication using an uplink resource associated with an identifier indicated by the simplified SSB.

Some aspects described herein relate to a method of wireless communication performed by an apparatus. The method may include transmitting a simplified SSB. The method may include receiving an uplink communication on an uplink resource associated with an identifier indicated by the simplified SSB.

Some aspects described herein relate to a method of wireless communication performed by a first apparatus. The method may include configuring a downlink transmission to include an indication of a mapping between an uplink resource and an identifier associated with a second apparatus. The method may include transmitting the downlink transmission in a cell of the first apparatus.

Aspects generally include a method, apparatus, system, computer program product, non-transitory computer-readable medium, user equipment, base station, network entity, network node, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8A and 8B are diagrams illustrating an example of identifying an uplink resource based at least in part on an uplink mapping, in accordance with the present disclosure.

DETAILED DESCRIPTION

Figure 1:
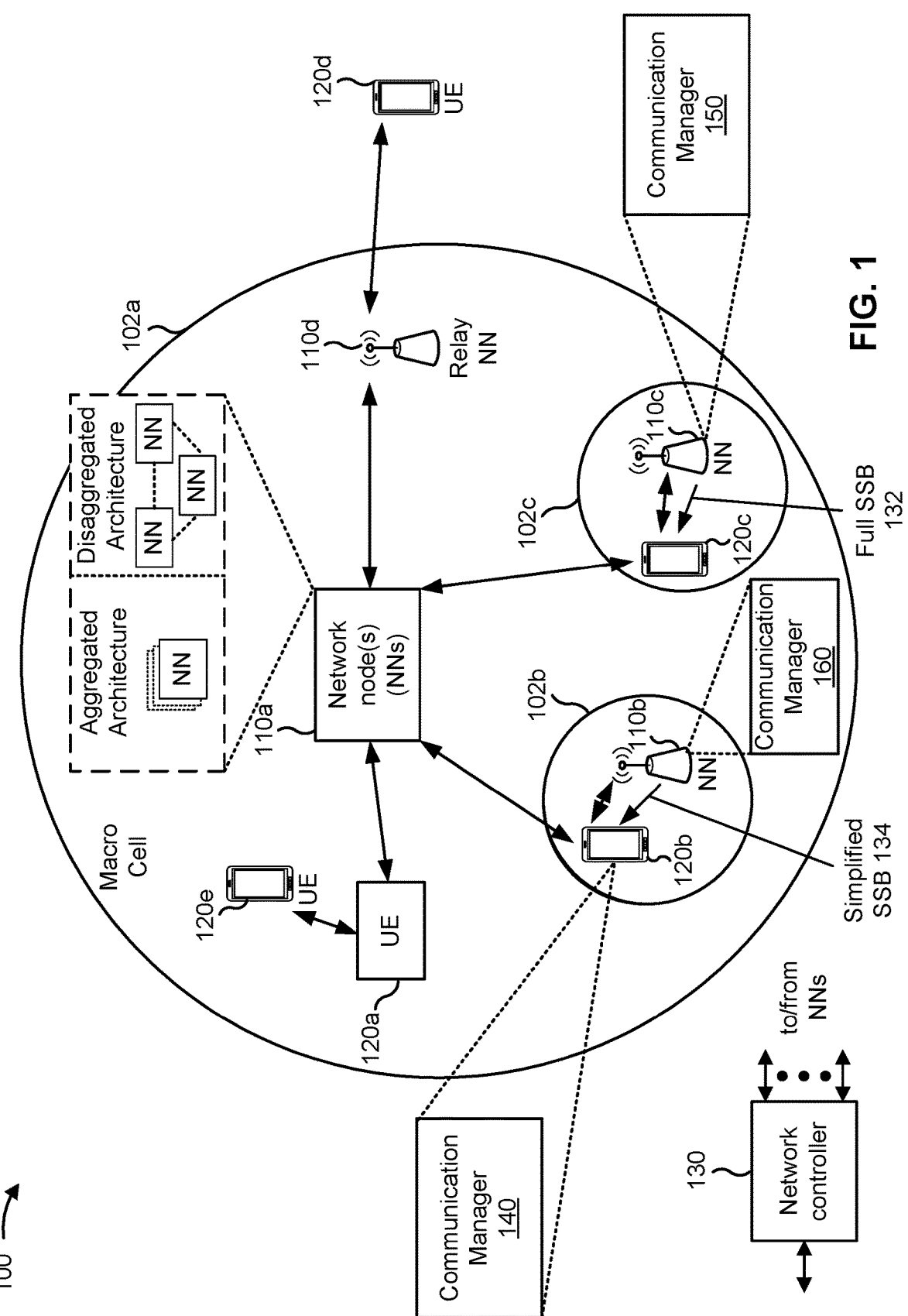
FIG. 1 is a diagram illustrating an example of a wireless network, in accordance with the present disclosure.

A network node may transmit one or more synchronization signals in a cell (e.g., a coverage area provided by a network node). One or more types of synchronization signals may be transmitted in a block referred to as a synchronization signal block (SSB). In some cases, different types of SSBs may be transmitted in neighboring cells. For example, a full SSB may be transmitted in a first cell, whereas a simplified SSB (or light SSB) may be transmitted in a second cell neighboring the first cell.

A full SSB includes resources (e.g., time domain resources, frequency domain resources) that carry a primary synchronization signal (PSS), a secondary synchronization signal (SSS), and a physical broadcast channel (PBCH). In contrast, a simplified SSB includes only a PSS, only a PSS and an SSS (e.g., no PBCH), or a PSS and an SSS with partial PBCH. Thus, a simplified SSB is a simplified version of a full SSB. According to one or more examples, a simplified SSB may reduce radio resource usage and/or energy usage in a cell by up, for example, to 20% or greater in that a simplified SSB may be transmitted on fewer orthogonal frequency division multiplexing (OFDM) symbols (e.g., as few as 2 OFDM symbols or fewer) relative to a full SSB. In one or more aspects, a user equipment (UE) may transmit an uplink cell wake-up signal (WUS) to obtain a full SSB in a cell in which a simplified SSB is broadcasted. An uplink cell WUS is a particular type of WUS that the UE transmits to a network node on an uplink to trigger an on-demand full SSB transmission from the network node to the UE on a downlink. The combination of the simplified SSB and the uplink cell WUS enables the reduced radio resource usage and/or energy usage when broadcasting SSBs, while still enabling UEs to obtain on-demand full SSBs.

The PBCH part of a full SSB provides a UE with an indication of resources on which system information (e.g., a master information block (MIB), a system information block 1 (SIB1)) is transmitted in a cell. The UE may obtain the location of uplink resources for initial access (e.g., random access channel (RACH) transmissions) and/or uplink WUS transmissions in the cell using the system information. However, with the reduction (or elimination) of the PBCH in the simplified SSB, a UE that enters, camps on, or connects to a cell in which a simplified SSB is transmitted may be unable to identify the location of resources on which the system information is transmitted in the cell. As a result, the UE may be unable to identify the uplink resources that may be used in the cell for initial access and/or uplink cell WUS transmissions if the UE wants to communicate with the network node providing the cell. The UE might instead transmit an uplink transmission (e.g., a RACH transmission, an uplink cell WUS transmission) in an uplink resource that is not monitored by the network node and/or in which another UE transmits an uplink transmission, which may result in a collision and/or may result in the uplink transmission by the UE being unreceived by the network node.

As described herein, according to one or more aspects, a UE may be provided/configured with an uplink resource mapping that enables the UE to identify uplink resources for initial access and/or uplink cell WUS transmissions in a cell, provided by the a network node, in which a simplified SSB is transmitted. In one example, the uplink resource mapping may be a mapping between the uplink resources and an identifier of a network node providing the cell. The UE may obtain or determine the identifier based on the simplified SSB transmitted in the cell by the network node, and may identify the uplink resources based on the identifier and the uplink resource mapping.

The uplink resource mapping described herein may reduce the likelihood of transmission/reception collisions in a cell in which a simplified SSB is transmitted. Without the uplink resource mapping, a UE might select uplink resources that collide with other transmissions in the cell, which can result in increase in dropped communications in the light SSB cell. According to some aspects, the uplink resource mapping described herein enables the UE to identify uplink resources that are allocated for uplink cell WUS and/or RACH transmissions. In this manner, the likelihood of collisions and/or the consumption of network resources in the cell is reduced because the occurrences of retransmissions due to collisions is reduced.

In accordance to one or more aspects, the uplink resource mapping described herein may increase the likelihood of uplink reception (e.g., of a RACH transmission, of an uplink cell WUS) at the network node that transmits a simplified SSB in the cell. In one example, without the uplink resource mapping, a UE might select uplink resources that the network node is not monitoring for uplink transmissions, which can result in uplink transmissions by the UE not being received at the network node. The uplink resource mapping described herein enables the UE to identify uplink resources that are monitored by the network node for uplink cell WUS and/or RACH transmissions, which increases the likelihood that uplink transmissions by the UE will be successfully received by the network node. This reduces the consumption of network resources in the cell because the occurrences of retransmissions due to unreceived uplink transmissions is reduced.

Accordingly, the uplink resource mapping described herein may facilitate the use of simplified SSB broadcasts in a cell. Thus, the uplink resource mapping described herein enables the radio resource savings and/or energy savings, described above, provided by the use of simplified SSB broadcasts in a cell.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. The wireless network may include one or more types of cells 102. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

The electromagnetic spectrum is often subdivided, by frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As further shown in FIG. 1, different types of SSBs may be transmitted in two or more cells 102. In some aspects, different types of SSBs may be transmitted in neighboring cells 102. As an example, a network node 110c may transmit (e.g., may broadcast, may multicast) a full SSB 132 in a cell 102c, whereas a network node 110b may transmit (e.g., may broadcast, may multicast) a simplified SSB 134 in a cell 102c. The use of simplified SSBs 134 in cells 102 in the wireless network 100 enables radio resource usage and/or energy consumption to be reduced in the cells 102.

In some aspects, the UE 120 may include a communication manager 140. As described in more detail elsewhere herein, the communication manager 140 may receive a simplified SSB 134 and may transmit an uplink communication using an uplink resource associated with an identifier indicated by the simplified SSB 134. The identifier may be associated with a network node 110 that transmits the simplified SSB 134, and/or may be associated with one or more aspects of the simplified SSB 134. Additionally, or alternatively, the communication manager 140 may perform one or more other operations described herein.

In some aspects, a network node 110 (e.g., that is configured to transmit a full SSB 132) may include a communication manager 150. As described in more detail elsewhere herein, the communication manager 150 may configure a downlink transmission to include an indication of a mapping between an uplink resource and an identifier associated with another network node 110 and may transmit the downlink transmission in a cell 102 of the network node 110. Additionally, or alternatively, the communication manager 150 may perform one or more other operations described herein.

In some aspects, a network node 110 (e.g., that is configured to transmit a simplified SSB 134) may include a communication manager 160. As described in more detail elsewhere herein, the communication manager 160 may transmit a simplified SSB 134 and may receive an uplink communication on an uplink resource associated with an identifier indicated by the simplified SSB 134. Additionally, or alternatively, the communication manager 160 may perform one or more other operations described herein.

As indicated above, FIG. 1 is provided as an example. Other examples may differ from what is described with regard to FIG. 1.

Figure 2:
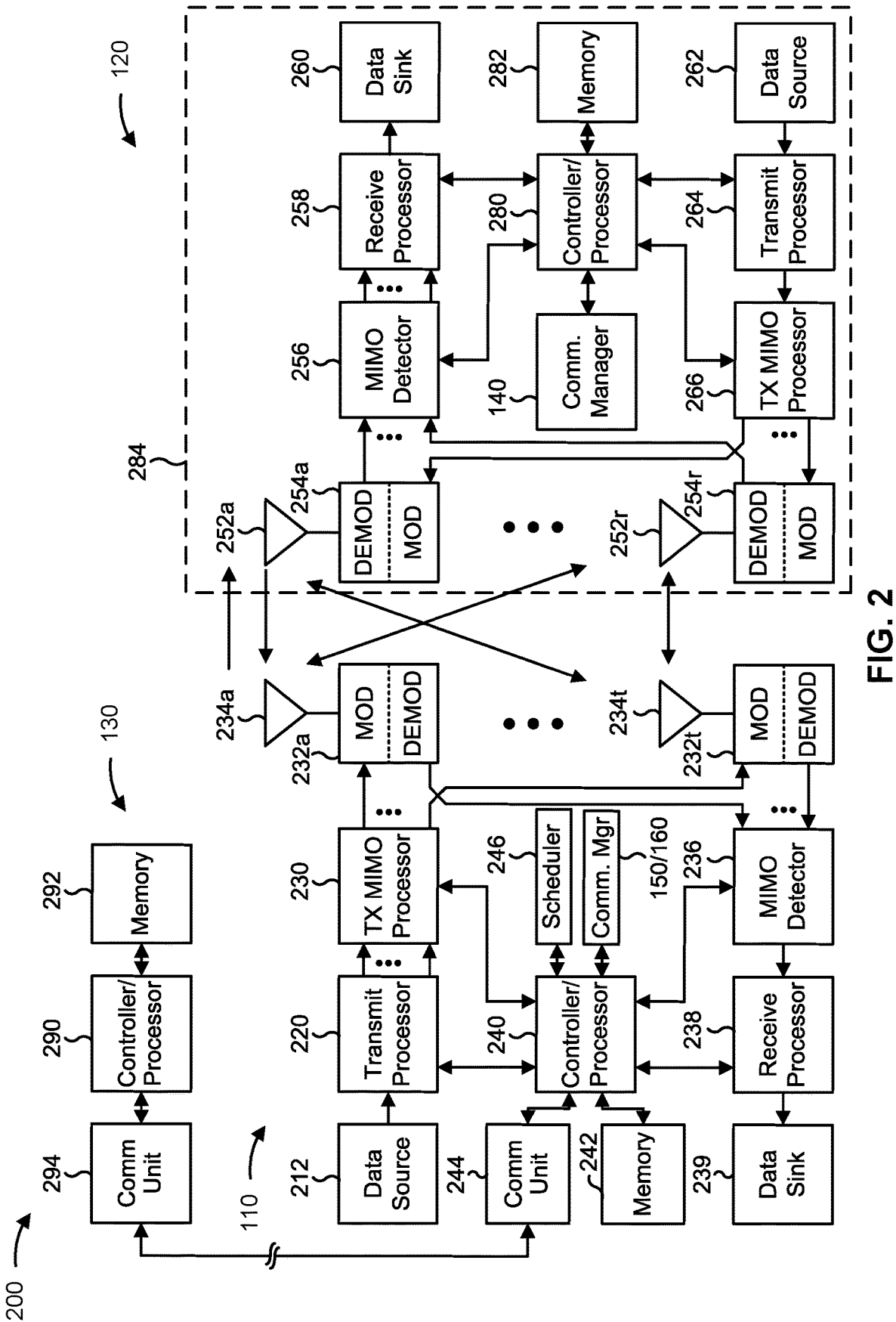
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the network node 110, the controller/processor 280 of the UE 120, and/or any other component(s) of FIG. 2 may perform one or more techniques associated with an uplink resource mapping for simplified SSB transmission, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE 120 may include means for receiving a simplified SSB 134, and/or means for transmitting an uplink communication using an uplink resource associated with an identifier indicated by the simplified SSB 134, among other examples. In some aspects, such means may include one or more components of UE 120 described in connection with FIG. 2, such as communication manager 140, controller/processor 280, transmit processor 264, TX MIMO processor 266, antenna 252, modem 254, MIMO detector 256, receive processor 258, or the like.

In some aspects, the network node 110 may include means for configuring a downlink transmission to include an indication of a mapping between an uplink resource and an identifier associated with another network node 110, and/or means for transmitting the downlink transmission in a cell 102 of the network node 110, among other examples. In some aspects, such means may include one or more components of network node 110 described in connection with FIG. 2, such as communication manager 150, antenna 234, MIMO detector 236, receive processor 238, controller/processor 240, transmit processor 220, TX MIMO processor 230, modem 232, antenna 234, or the like.

In some aspects, the network node 110 may include means for transmitting a simplified SSB 134, and/or means for receiving an uplink communication on an uplink resource associated with an identifier indicated by the simplified SSB 134, among other examples. In some aspects, such means may include one or more components of the network node 110 described in connection with FIG. 2, such as communication manager 160, antenna 234, MIMO detector 236, receive processor 238, controller/processor 240, transmit processor 220, TX MIMO processor 230, modem 232, antenna 234, or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
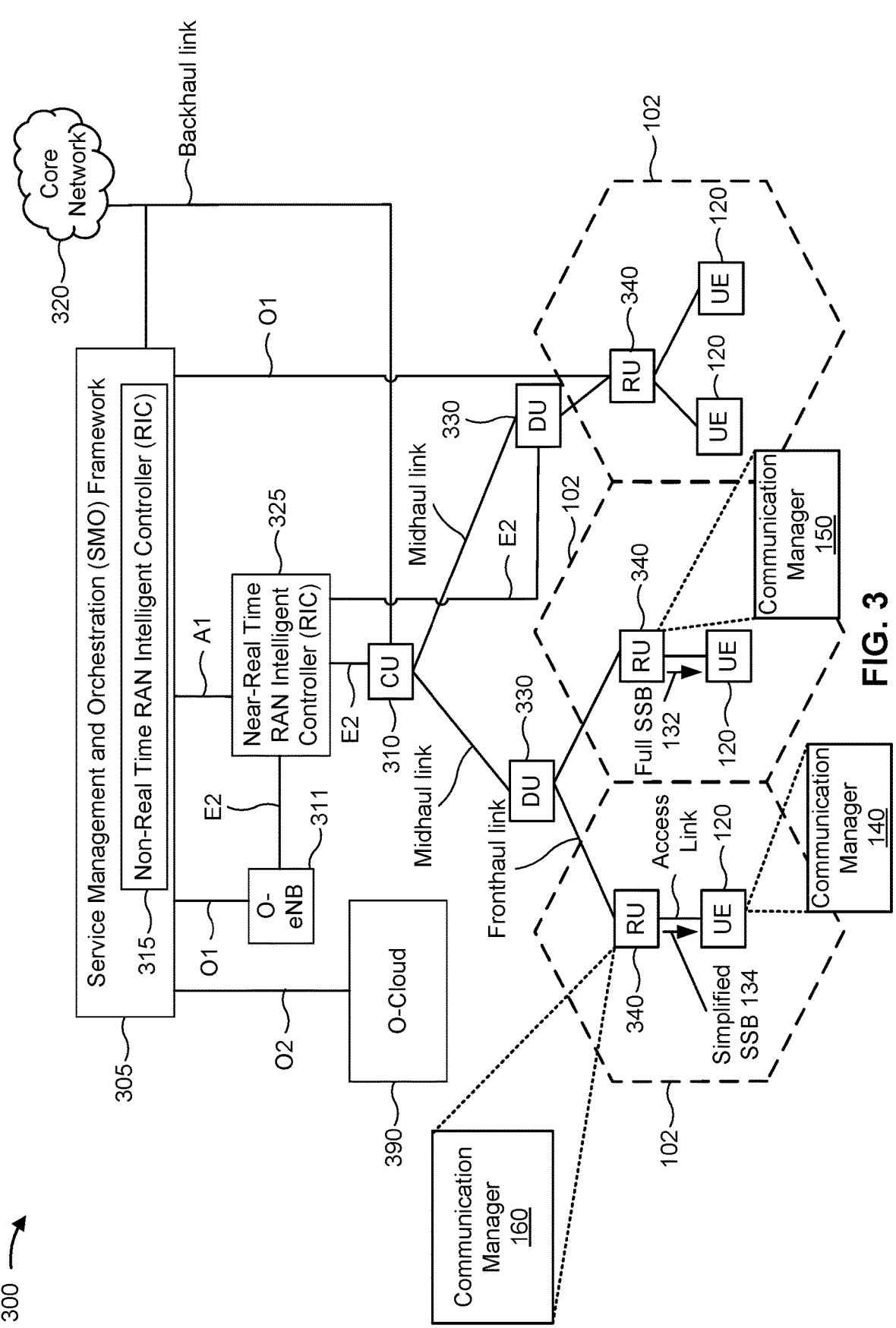
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may be deployed in the wireless network 100. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As further shown in FIG. 3, different types of SSBs may be transmitted in two or more cells 102. In some aspects, different types of SSBs may be transmitted in neighboring cells 102. As an example, a first RU 340 may transmit (e.g., may broadcast, may multicast) a full SSB 132 in a first cell 102, whereas a second RU 340 may transmit (e.g., may broadcast, may multicast) a simplified SSB 134 in a second cell 102 neighboring the first cell 102. The use of simplified SSBs 134 in cells 102 in the disaggregated base station architecture 300 enables radio resource usage and/or energy consumption to be reduced in the cells 102.

In some aspects, a UE 120 in a cell 102 of an RU 340 may include the communication manager 140. As described in more detail elsewhere herein, the communication manager 140 may receive a simplified SSB 134 and may transmit an uplink communication using an uplink resource associated with an identifier indicated by the simplified SSB 134. The identifier may be associated with the RU 340 that transmits the simplified SSB 134, and/or may be associated with one or more aspects of the simplified SSB 134. Additionally, or alternatively, the communication manager 140 may perform one or more other operations described herein.

In some aspects, an RU 340 (e.g., that is configured to transmit a full SSB 132) may include a communication manager 150. As described in more detail elsewhere herein, the communication manager 150 may configure a downlink transmission to include an indication of a mapping between an uplink resource and an identifier associated with another RU 340 and may transmit the downlink transmission in a cell 102 of the RU 340. Additionally, or alternatively, the communication manager 150 may perform one or more other operations described herein.

In some aspects, an RU 340 (e.g., that is configured to transmit a simplified SSB 134) may include a communication manager 160. As described in more detail elsewhere herein, the communication manager 160 may transmit a simplified SSB 134 and may receive an uplink communication on an uplink resource associated with an identifier indicated by the simplified SSB 134. Additionally, or alternatively, the communication manager 160 may perform one or more other operations described herein.

As indicated above, FIG. 3 is provided as an example. Other examples may differ from what is described with regard to FIG. 3.

Figure 4:
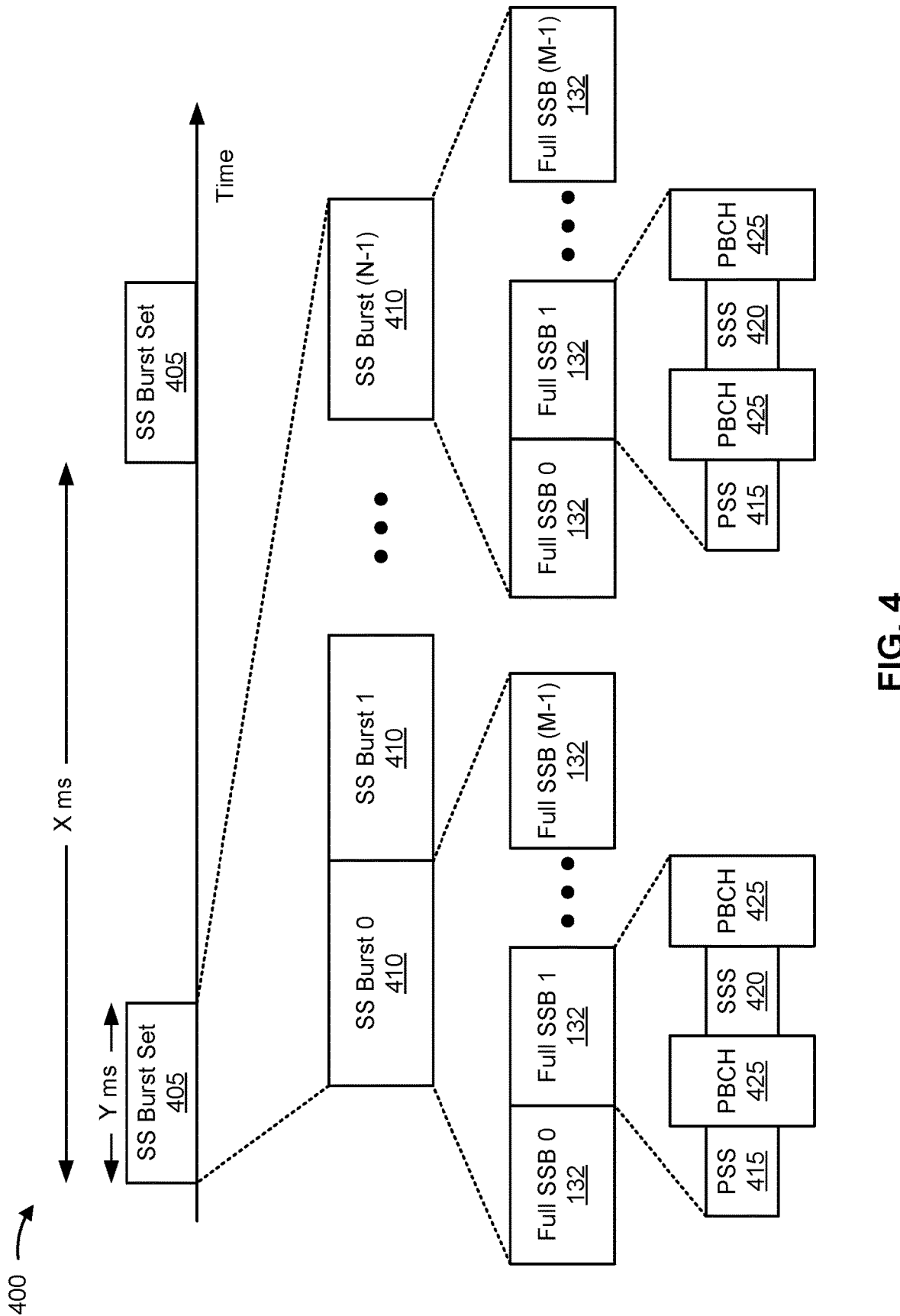
FIG. 4 is a diagram illustrating an example of a synchronization signal hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by one or more network nodes.

As further shown, each SS burst 410 may include one or more full SSBs 132, shown as full SSB 0 through full SSB M−1, where M is a maximum number of full SSBs 132 that can be carried by an SS burst 410. In some aspects, different full SSBs 132 may be beam-formed differently (e.g., transmitted using different beams), and may be used for cell search, cell acquisition, beam management, and/or beam selection (e.g., as part of an initial network access procedure). An SS burst set 405 may be periodically transmitted by a wireless node (e.g., a network node 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window.

A full SSB 132 includes resources that carry a PSS 415, a SSS 420, and a PBCH 425. In some aspects, multiple fulls SSBs 132 are included in an SS burst 410 (e.g., with transmission on different beams), and the PSS 415, the SSS 420, and/or the PBCH 425 may be the same across each full SSB 132 of the SS burst 410. In some aspects, a single full SSB 132 may be included in an SS burst 410. In some aspects, the full SSB 132 may be at least four symbols (e.g., OFDM symbols) in length, where each symbol carries one or more of the PSS 415 (e.g., occupying one symbol), the SSS 420 (e.g., occupying one symbol), and/or the PBCH 425 (e.g., occupying two symbols). In some aspects, a full SSB 132 may be referred to as an SS/PBCH block.

In some aspects, the symbols of a full SSB 132 are consecutive, as shown in FIG. 4. In some aspects, the symbols of a full SSB 132 are non-consecutive. Similarly, in some aspects, one or more full SSBs 132 of the SS burst 410 may be transmitted in consecutive radio resources (e.g., consecutive symbols) during one or more slots. Additionally, or alternatively, one or more full SSBs 132 of the SS burst 410 may be transmitted in non-consecutive radio resources.

In some aspects, the SS bursts 410 may have a burst period, and the full SSBs 132 of the SS burst 410 may be transmitted by a wireless node (e.g., a network node 110) according to the burst period. In this case, the full SSBs 132 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, a full SSB 132 may include an SSB index, which may correspond to a beam used to carry the full SSB 132. A UE 120 may monitor for and/or measure full SSBs 132 using different receive (Rx) beams during an initial network access procedure and/or a cell search procedure, among other examples. Based at least in part on the monitoring and/or measuring, the UE 120 may indicate one or more full SSBs 132 with a best signal parameter (e.g., a reference signal received power (RSRP) parameter) to a network node 110 (e.g., directly or via one or more other network nodes). The network node 110 and the UE 120 may use the one or more indicated full SSBs 132 to select one or more beams to be used for communication between the network node 110 and the UE 120 (e.g., for a random access channel (RACH) procedure). Additionally, or alternatively, the UE 120 may use the full SSB 132 and/or the SSB index to determine a cell timing for a cell via which the full SSB 132 is received (e.g., a serving cell).

In some aspects, the UE 120 may identify, based at least in part on a full SSB 132, one or more resources (e.g., time domain resources, frequency domain resources) in which a network node 110 transmits other downlink signals in a cell 102. For example, the UE 120 may identify, based at least in part on a PBCH 425 of a full SSB 132, one or more downlink resources in which the network node 110 transmits system information in the cell 102. The system information may include one or more system information blocks (SIBs), such as SIB1, SIB2, and so on. The UE 120 may further identify, based at least in part on the PBCH 425, one or more uplink resources (e.g., time domain resources, frequency domain resources) that are allocated for transmitting uplink communications in the cell 102. The one or more uplink resources may include an uplink resource in which the UE 120 is permitted to transmit an uplink cell WUS to the network node 110, and uplink resource in which the UE 120 is permitted to transmit a RACH transmission to the network node 110, and/or another uplink resource. A RACH transmission may include a message 1 (Msg1) transmission (e.g., for a 4-step RACH procedure), a message A (MsgA) transmission (e.g., for a 2-step RACH procedure), and/or another type of RACH transmission.

As indicated above, FIG. 4 is provided as an example. Other examples may differ from what is described with regard to FIG. 4.

Figure 5:
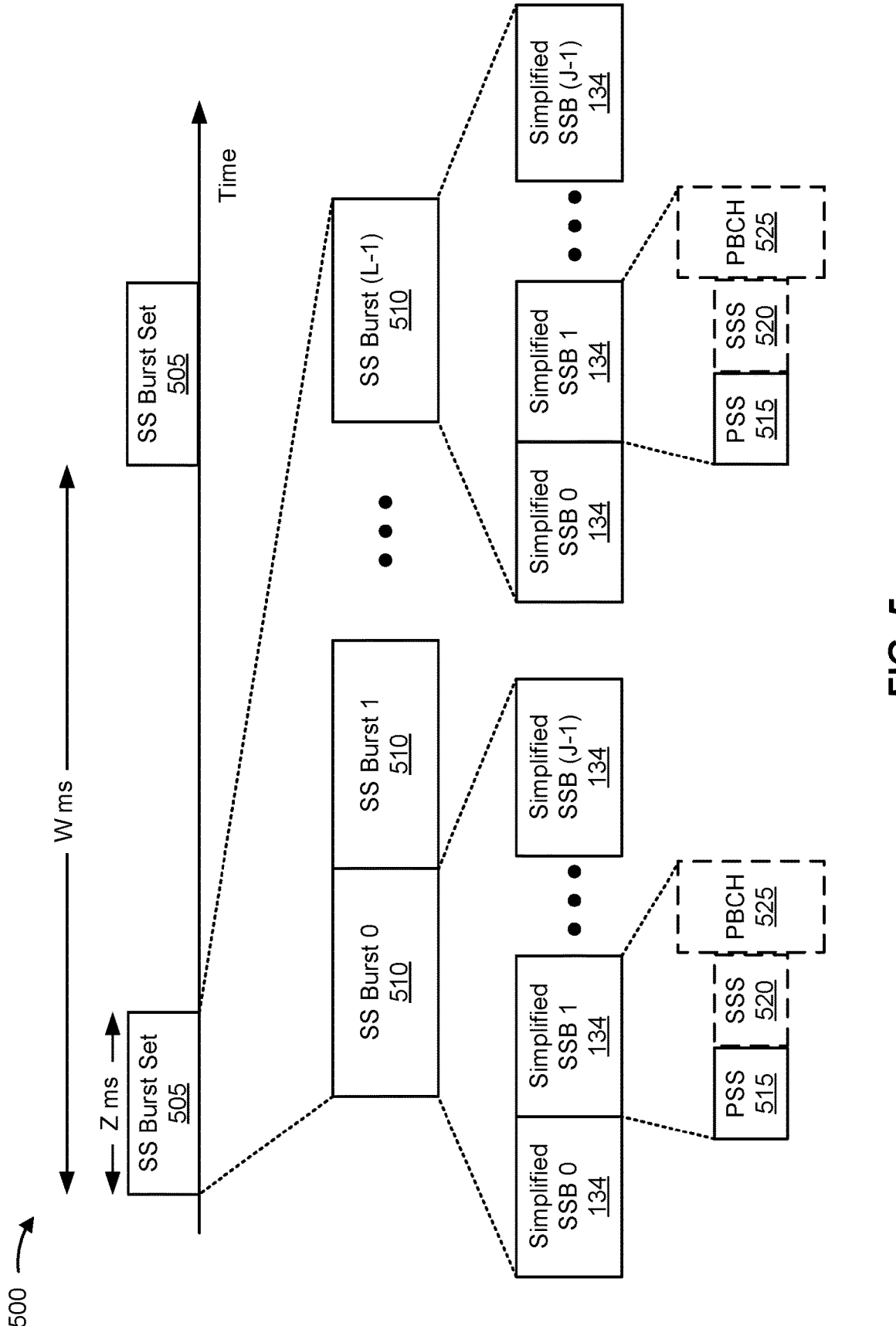
FIG. 5 is a diagram illustrating an example of a synchronization signal hierarchy, in accordance with the present disclosure.

FIG. 5 is a diagram illustrating an example 500 of a synchronization signal hierarchy, in accordance with the present disclosure. As shown in FIG. 5, the SS hierarchy may include an SS burst set 505, which may include multiple SS bursts 510, shown as SS burst 0 through SS burst L−1, where L is a maximum number of repetitions of the SS burst 510 that may be transmitted by one or more network nodes.

As further shown, each SS burst 510 may include one or more simplified SSBs 134, shown as simplified SSB 0 through simplified SSB J−1, where J is a maximum number of simplified SSBs 134 that can be carried by an SS burst 510. In some aspects, different simplified SSBs 134 may be beam-formed differently (e.g., transmitted using different beams), and may be used for cell search, cell acquisition, beam management, and/or beam selection (e.g., as part of an initial network access procedure). An SS burst set 505 may be periodically transmitted by a wireless node (e.g., a network node 110), such as every W milliseconds, as shown in FIG. 5. In some aspects, an SS burst set 505 may have a fixed or dynamic length, shown as Z milliseconds in FIG. 5. In some cases, an SS burst set 505 or an SS burst 510 may be referred to as a DRS transmission window or an SMTC window.

A simplified SSB 134 (also referred to as a light SSB or a simplified version of SSB) includes resources that carry a PSS 515. In some aspects, a simplified SSB 134 may include only a PSS 515. In some aspects, a simplified SSB 134 may include only a PSS 515 and an SSS 520 (e.g., no PBCH

525). In some aspects, a simplified SSB 134 may include a PSS 515, an SSS 520, and a portion of PBCH 525. In some aspects, multiple simplified SSBs 134 are included in an SS burst 510 (e.g., with transmission on different beams), and the PSS 515, the SSS 520, and/or the PBCH 525 may be the same across each simplified SSBs 134 of the SS burst 510. In some aspects, a single simplified SSBs134 may be included in an SS burst 510. In some aspects, the simplified SSB 134 may be two symbols (e.g., OFDM symbols) in length or less. For example, a simplified SSB 134 may include one symbol that carries a PSS 515. As another example, a simplified SSB 134 may include two symbols: a first symbol that carries a PSS 515 and a second symbol that carries an SSS 520.

As indicated above, FIG. 5 is provided as an example. Other examples may differ from what is described with regard to FIG. 5.

Figure 6:
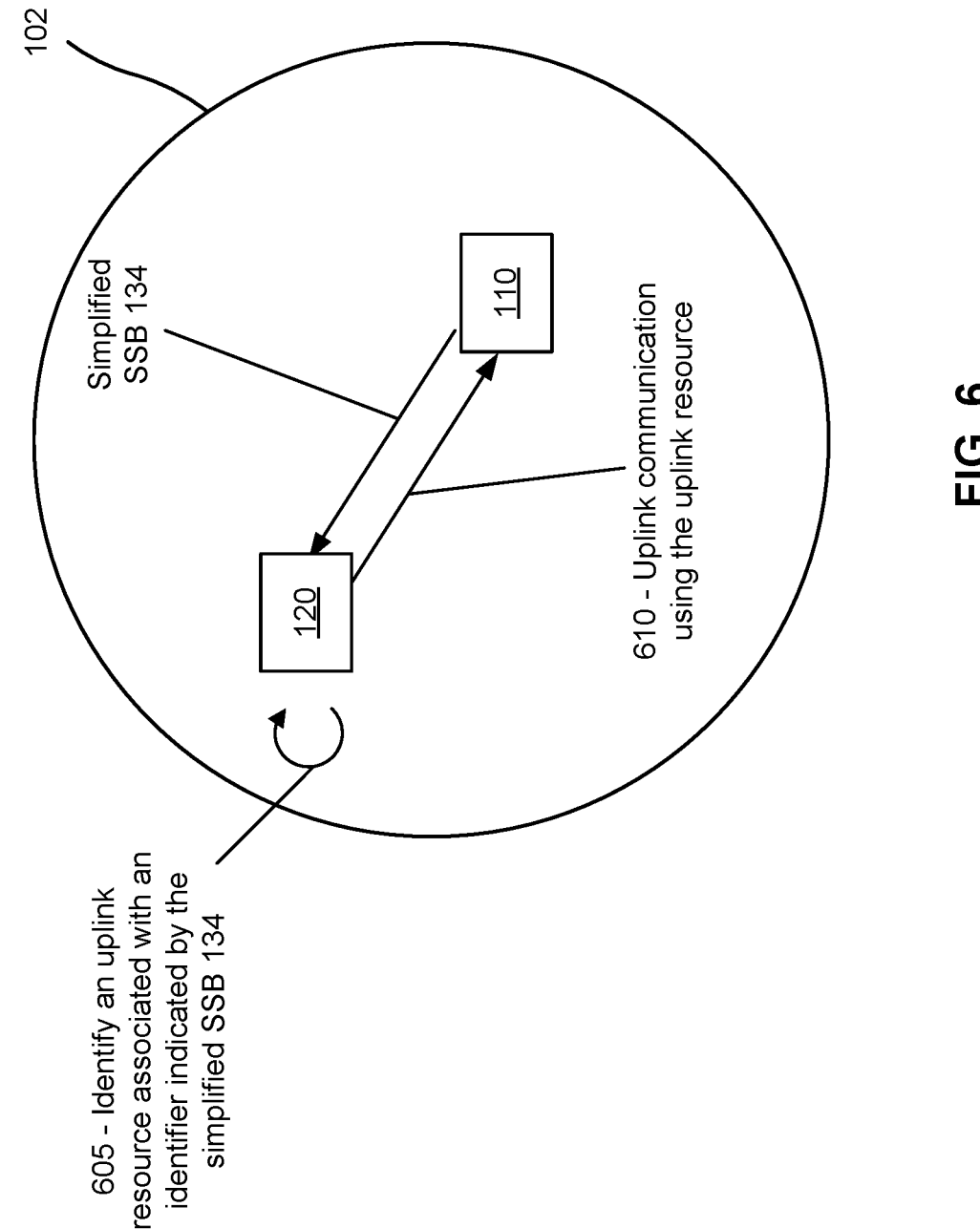
FIG. 6 is a diagram illustrating an example of identifying an uplink resource based at least in part on an uplink mapping, in accordance with the present disclosure.

FIG. 6 is a diagram illustrating an example 600 of identifying an uplink resource based at least in part on an uplink mapping, in accordance with the present disclosure. As shown in FIG. 6, the example 600 may include communication between a UE 120 and a network node 110. The UE 120 and the network node 110 may be included in a wireless network, such as the wireless network 100 described herein. The network node 110 may provide a cell 102 of the wireless network 100. Alternatively, the operations of the network node 110 described in connection with the example 600 may be performed by a CU 310, a DU 330, and/or an RU 340 in a disaggregated base station architecture 300 in the wireless network 100.

In the cell 102, the network node 110 may transmit (e.g., may broadcast, may multicast) a simplified SSB 134 described herein. The UE 120 may receive the simplified SSB 134 in the cell 102. In some aspects, the UE 120 receives the simplified SSB 134 when in a connected mode (e.g., a radio resource control (RRC) active mode) in the cell 102. In the RRC connected mode, the UE 120 may have an established RRC connection with the network node 110. In some aspects, the UE 120 receives the simplified SSB 134 when in an idle mode (e.g., an RRC idle mode). In the idle mode, the UE 120 camps on the cell 102 without an active connection with the network node 110. In some aspects, the UE 120 receives the simplified SSB 134 when in inactive mode (e.g., an RRC inactive mode). The inactive mode may functionally reside between connected mode and idle mode.

In some aspects, the UE 120 determines that the network node 110 transmits the simplified SSB 134 (e.g., as opposed to transmitting a full SSB 132), and receives the simplified SSB 134 based at least in part on the determination. In some aspects, the UE 120 determines that the network node 110 transmits the simplified SSB 134 based at least in part on receiving an indication in a neighboring cell. For example, the UE 120 determines that the network node 110 transmits the simplified SSB 134 based at least in part on system information (e.g., MIB, SIB1, physical downlink control channel (PDCCH)) in a neighboring cell that, where the system information indicates that the network node 110 transmits the simplified SSB 134. As another example, the UE 120 is configured (e.g., pre-configured) with information indicating that the network node 110 transmits the simplified SSB 134, and the UE 120 may determine that the network node 110 transmits the simplified SSB 134 based at least in part on the configuration.

As another example, the UE 120 may determine that the network node 110 transmits the simplified SSB 134 based at least in part on receiving an indication of a mapping between an identifier (e.g., associated with the simplified SSB 134 and/or the network node 110) and an uplink resource that is allocated for uplink communications in the cell 102 (e.g., for uplink cell WUS, for RACH transmissions). Here, the indication of the mapping may be received in a neighboring cell 102, and the UE 120 may treat the indication of the mapping as an implicit/indirect way of signaling to the UE 120 that the network node 110 transmit a light SSB (e.g., the simplified SSB 134).

At 605, the UE 120 may identify an uplink resource associated with an identifier indicated by the simplified SSB 134. The UE 120 may identify the uplink resource based at least in part on determining to transmit an uplink communication to the network node 110. The uplink communication may include uplink cell WUS, a RACH transmission, and/or another type of uplink communication. The UE 120 may identify the uplink resource so that the UE 120 can use the uplink resource to transmit the uplink communication to the network node 110.

As indicated above, the simplified SSB 134 may include only a portion of PBCH 525, or no PBCH 525 at all. As a result, the UE 120 may be unable to directly use the simplified SSB 134 to identify system information (e.g., MIB, SIB1, PDCCH) in which the uplink resource would otherwise identified in a cell in which a full SSB 132 is transmitted. Accordingly, the UE 120 may use a mapping between the identifier and the uplink resource to identify the uplink resource. The mapping between the identifier and the uplink resource may be signaled to the UE 120 in a neighboring cell, may be configured (e.g., pre-configured) at the UE 120, and/or may be indicated to the UE 120 using another technique.

The mapping may include a mapping between one or more types of identifiers and one or more uplink resources for transmitting uplink communications in the cell 102. For example, if the simplified SSB 134 includes PSS 515 only, the UE 120 may acquire or determine a PSS identifier (e.g., an $$N_{ID}^2$$

identifier) based at least in part on the simplified SSB 134. The PSS identifier may be associated with the PSS 515 and may be in a range such as 0 to 2 (e.g., {0, 1, 2}). The UE 120 may identify the uplink resource that is associated with the PSS identifier determined from the PSS 515 of the simplified SSB 134.

As another example, if the simplified SSB 134 includes only a PSS 515 and an SSS 520 (e.g., no PBCH 525), the UE 120 may acquire or determine the PSS identifier associated with the PSS 515 and an SSS identifier (e.g., an $$N_{ID}^1$$

identifier) based at least in part on the SSS 520 of the simplified SSB 134. The SSS identifier may be associated with the SSS 520 and may be in a range such as 0 to 355 (e.g., {0, 1, . . . , 355}). The UE 120 may determine a cell identifier (e.g., an $$N_{ID}^{Cell}$$

identifier) associated with the network node 110 and/or the cell 102 based at least in part on the PSS identifier and the SSS identifier. As an example, the UE 120 may determine the cell identifier based at least in part on:

$$N_{ID}^{Cell} = 3N_{ID}^1 + N_{ID}^2$$

The cell identifier may be in a range such as 0 to 1008 (e.g., {0, 1, . . . , 1008}). The UE 120 may identify the uplink resource that is associated with the cell identifier determined based at least in part on PSS 515 and the SSS 520 of the simplified SSB 134.

The mapping may be indicated in a mapping table, a configuration, and/or another type of data structure stored by the UE 120. The UE 120 may store mappings for a plurality of cells 102 in the wireless network 100. In some aspects, the UE 120 stores a plurality of mappings for a single cell 102. For example, the UE 120 may store a mapping between a PSS identifier of a cell 102 and an uplink resource in the cell 102, may store a mapping between a cell identifier of the cell 102 and an uplink resource (e.g., the same uplink resource as the PSS identifier or a different uplink resource), and so on. As another example, the UE 120 may store a mapping between a PSS identifier of a cell 102 and an uplink resource in the cell 102 for uplink cell WUS, may store a mapping between the PSS identifier and an uplink resource for RACH transmissions, and so on.

At 610, the UE 120 may use the uplink resource to transmit the uplink communication to the network node 110. The uplink communication may include an uplink cell WUS, a RACH transmission, and/or another type of uplink communication.

In this way, the UE 120 has many chances/opportunities of getting the appropriate uplink cell WUS configuration and/or the appropriate RACH configuration of a cell transmitting only a light SSB (e.g., a simplified SSB 134). In some aspects, this information (e.g., the mapping information) can be available via SIB1 (e.g., in neighbor cells), via dedicated RRC signaling (e.g., in the neighbor cells), and/or may be pre-configured at the UE 120, among other examples. Depending on whether UE 120 is in connected mode or in idle/inactive mode, the mapping may be signaled to the UE 120 via RRC or medium access control (MAC) control element (MAC-CE) signaling (e.g., for UEs 120 in connected mode) or via system information (for UEs 120 in idle/inactive mode) in a neighbor cell 102 in which the UE 102 was located prior to entering the cell 102 of the network node 110 transmitting light SSB (e.g., a simplified SSB 134).

In implementations in which the UE 120 switches on a receiver/transmitter for the very first time in a cell 102 and detects light SSB (e.g., a simplified SSB 134) in the cell 102 (or in all cells 102 the UE 120 can detect), and the UE 120 does not yet have the mapping table between the detected identifier and the uplink resource (e.g., the uplink cell WUS configuration, the RACH configuration) of the cell 102, the UE 120 may be pre-configured with a list of K mappings between candidate identifiers and uplink resources (e.g., K uplink cell WUS configurations, K RACH configurations). K may be in a range from 2 up to 1008, for example. In aspects in which K=1008, the UE 120 may try ascending mappings until the UE 120 manages to wake up the cell 102 in which the UE 120 has camped. In aspects in which K<1008 (e.g., e.g. K=4), where the pre-configured mappings is less than the total number of available cell identifiers, then, the network node 110 of the cell 102 may monitor both the uplink resources configured in the cell 102 (e.g., for uplink cell WUS and/or RACH transmissions) and a set of fallback uplink resources that are pre-configured for the UE 120 (e.g., for uplink cell WUS and/or RACH transmissions).

As indicated above, FIG. 6 is provided as an example. Other examples may differ from what is described with regard to FIG. 6.

Figure 7A:
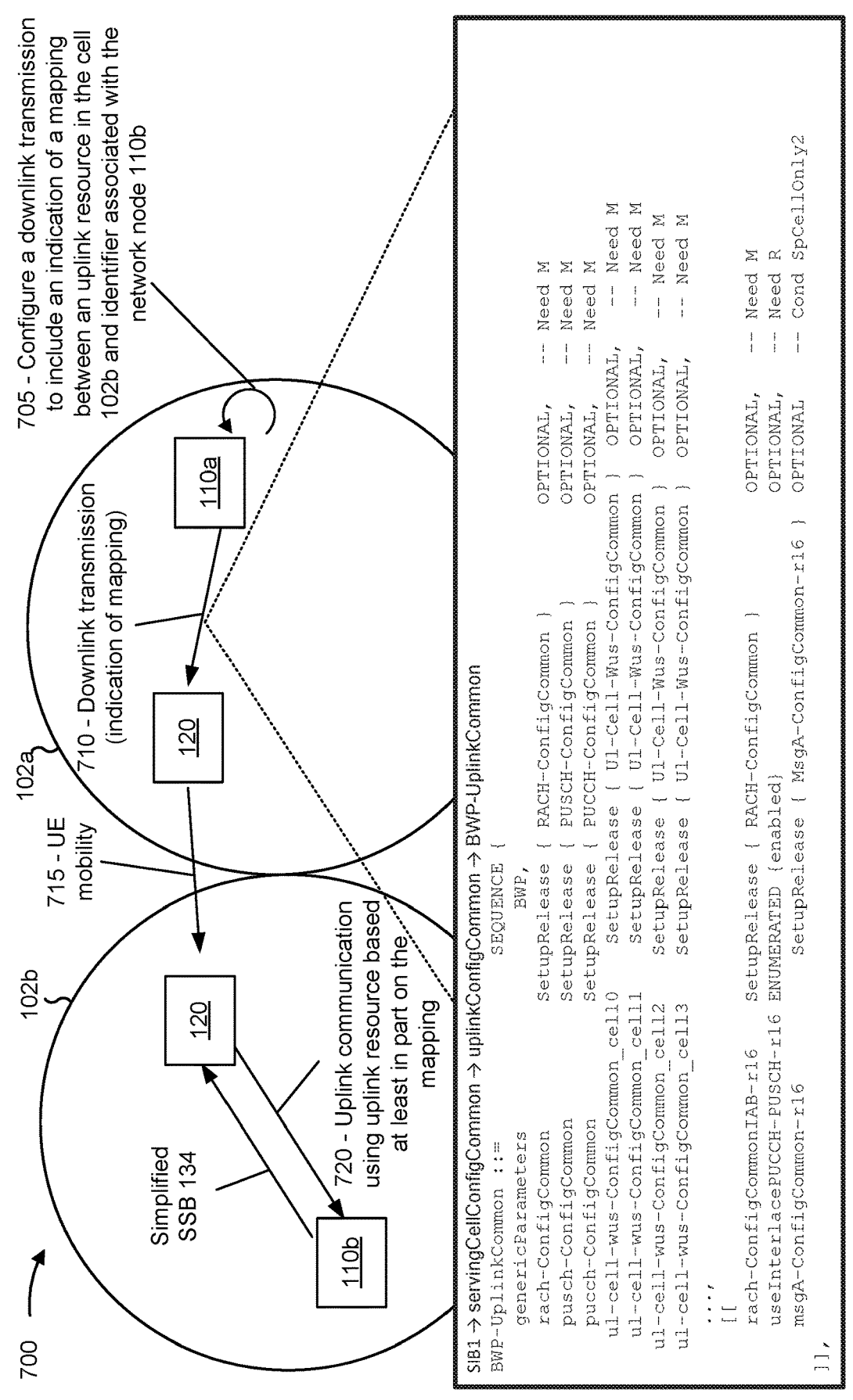
FIGS. 7A and 7B are diagrams illustrating an example of identifying an uplink resource based at least in part on an uplink mapping, in accordance with the present disclosure.
Figure 7B:
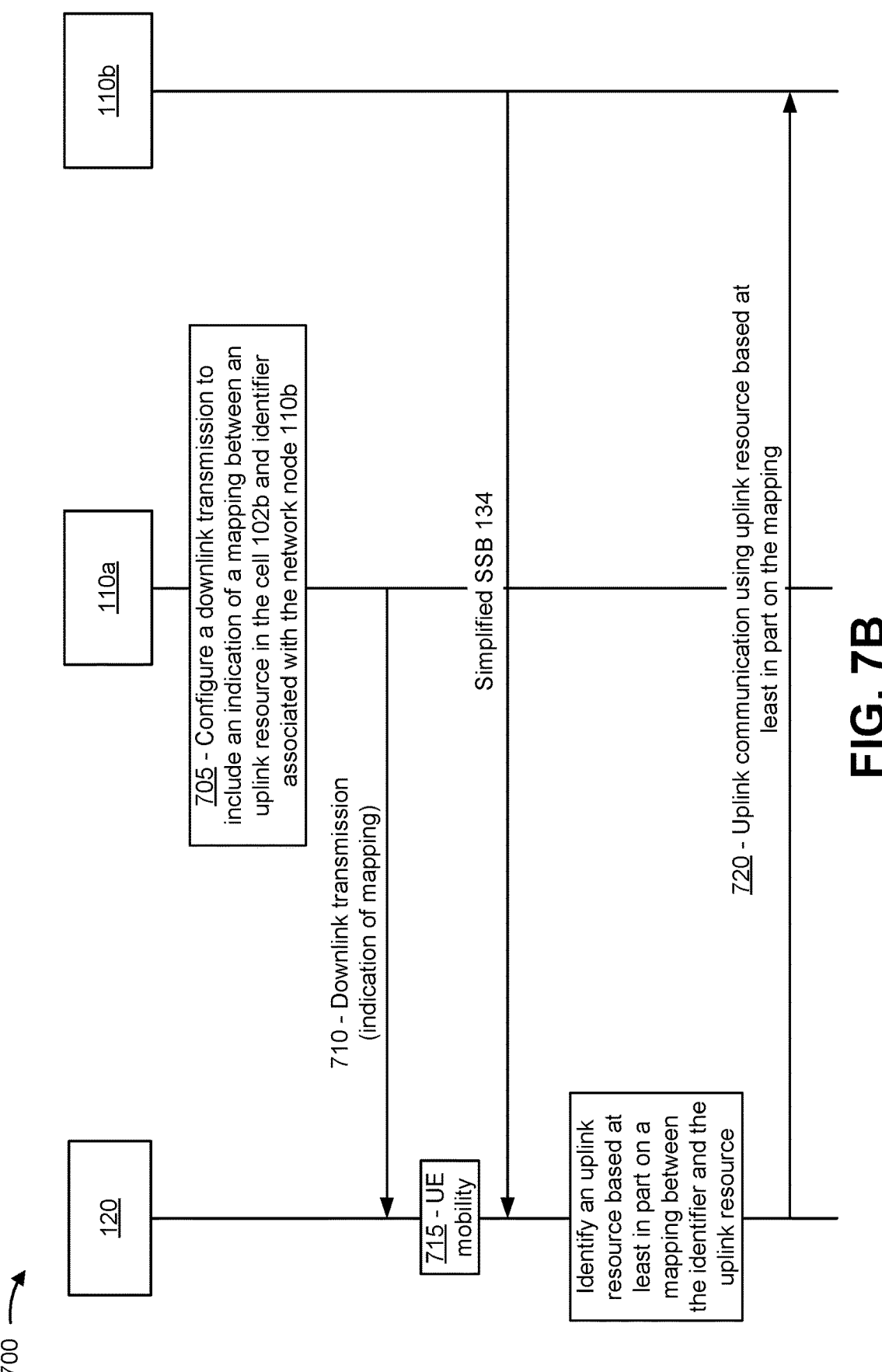

FIGS. 7A and 7B are diagrams illustrating an example 700 of identifying an uplink resource based at least in part on an uplink mapping, in accordance with the present disclosure. As shown in FIGS. 7A and 7B, the example 700 may include communication between a UE 120 and a plurality of network nodes 110, including a network node 110a and a network node 110b. The UE 120 and the network nodes 110 may be included in a wireless network, such as the wireless network 100 described herein. Alternatively, the operations of the network nodes 110 described in connection with the example 700 may be performed by a CU 310, a DU 330, and/or an RU 340 in a disaggregated base station architecture 300 in the wireless network 100.

The network node 110a may provide a cell 102a of the wireless network 100. In the cell 102a, the network node 110a may transmit (e.g., may broadcast, may multicast) a full SSB 132 and full system information (e.g., MIB, SIBs including SIB1, PDCCH). The network node 110b may provide a cell 102b of the wireless network 100. The cells 102a and 102b may be neighboring cells (e.g., cells that are adjacent and/or partially overlapping). In the cell 102b, the network node 110b may transmit (e.g., may broadcast, may multicast) a simplified SSB 134.

As shown in FIGS. 7A and 7B, at 705, the network node 110a may configure a downlink transmission that is to be transmitted to UEs in the cell 102a. The downlink transmission may include a full SSB 132, an RRC communication, dedicated RRC signaling, a MAC-CE communication, system information, and/or another type of downlink transmission. System information may include a MIB, a SIB (e.g., SIB0, SIB1), remaining minimum system information (RMSI), PDCCH, and/or another type of system information.

The network node 110a may configure the downlink transmission to include, among other types of information, an indication of a mapping between an identifier associated with the network node 110b and an uplink resource that may be used in the cell 102b for transmitting uplink communications such as an uplink cell WUS and/or RACH transmissions, among other examples. In implementations in which the simplified SSB 134 transmitted by the network node 110b in the cell 102b includes only a PSS 515, the network node 110a may configure the downlink transmission to include a mapping between a PSS identifier (e.g., an $$N_{ID}^2$$

identifier) associated with the PSS 515 and the uplink resource. In implementations in which the simplified SSB 134 transmitted by the network node 110b in the cell 102b includes a PSS 515 and an SSS 520 only (e.g., no PBCH), the network node 110a may configure the downlink transmission to include a mapping between a cell identifier (e.g., an $$N_{ID}^{Cell}$$

identifier) associated with the network node 110b and/or the cell 102b and the uplink resource. In some aspects, the network node 110a may configure the downlink transmission to include mappings for the PSS identifier (e.g., an $$N_{ID}^2$$

identifier) and the cell identifier (e.g., an $$N_{ID}^{Cell}$$

identifier). In some aspects, the network node 110 may configure the downlink transmission to include mappings for identifiers and uplink resources for a plurality of cells 102 neighboring the cell 102a in which simplified SSBs 134 are transmitted. In some aspects, the network node 110 may configure the downlink transmission to include an indication that the network node 110b (and/or other network nodes 110 neighboring the network node 110a) transmits a simplified SSB 134 so that UEs 120 that receive the downlink transmission can identify cells 102 in which simplified SSBs 134 are transmitted.

FIG. 7A illustrates an example in which the network node 110a configures the downlink transmission such that mapping(s) for the network node 110b are included in a mapping table in one or more fields, one or more information elements (IEs), and/or in one or more other locations in the downlink transmission. As an example, the network node 110a may configure a SIB1 to include the mapping table in a servingCellConfigCommon IE in the SIB1. As another example, the network node 110a may configure a SIB1 to include the mapping table in an uplinkConfigCommon IE that is included in the servingCellConfigCommon IE in the SIB1. As an example, the network node 110a may configure a SIB1 to include the mapping table in a BWP-UplinkCommon IE that is included in the uplink ConfigCommon IE in the SIB1.

As further shown in FIG. 7A, the mapping table may be included in one or more configurations in the one or more IEs. For example, one or more mappings for uplink resource (s) for uplink cell WUS may be indicated in an uplink cell WUS configuration (e.g., an ul-cell-wus-ConfigCommon). The uplink cell WUS configuration may be included in one or more IEs in the SIB1 (e.g., SIB1→servingCellConfigCommon→ uplinkConfigCommon→BWP-UplinkCommon→ul-cell-wus-ConfigCommon). In some aspects, respective uplink cell WUS configurations may be included for each cell 102 of a plurality of cells 102 (e.g., an ul-cell-wus-ConfigCommon_cell0, an ul-cell-wus-ConfigCommon_cell1, and so on).

As another example, one or more mappings for uplink resource(s) for RACH transmissions may be indicated in a RACH configuration (e.g., a rach-ConfigCommon IE). The RACH configuration may be included in one or more IEs in the SIB1 (e.g., SIB1→servingCellConfigCommon→ uplinkConfigCommon→BWP-UplinkCommon→rach-ConfigCommon).

In some aspects, the SIB1 may include a plurality of RACH configurations for different types of RACH procedures. As an example, the SIB1 may include an AdditionalRACH-Config-r17 IE (e.g., SIB1→servingCellConfigCommon→uplink ConfigCommon→BWP-UplinkCommon→AdditionalRACH-Configr17) that includes a RACH configuration for two-step RACH procedures (e.g., msgA-ConfigCommon-r17) and a RACH configuration for four-step RACH procedures (e.g., rach-ConfigCommon-r17). Here, one or more of the RACH configurations may include mapping(s) for uplink resource(s) for RACH transmissions. As an example, the RACH configuration for two-step RACH procedures (e.g., msgA-ConfigCommon-r17) may include mapping(s) for uplink resource(s) for RACH transmissions in two-step RACH procedures, and the RACH configuration for four-step RACH procedures (e.g., rach-ConfigCommon-r17) may include mapping(s) for uplink resource(s) for RACH transmissions in four-step RACH procedures.

The configuration(s) in the downlink transmission may include additional parameters and/or information associated with the uplink resources that may be used for uplink cell WUS and/or RACH transmissions in the cell 102b. For example, an uplink cell WUS configuration in SIB1 may indicate parameters for the uplink resource(s) for uplink cell WUS transmission in the cell 102b. As another example, a RACH configuration in SIB1 may indicate parameters for the uplink resource(s) for RACH transmission in the cell 102b.

The parameters for an uplink resource may include an indication of a time domain allocation for the uplink resource, an indication of a frequency domain allocation for the uplink resource, an indication of a spatial domain allocation for the uplink resource, and/or an indication of a power allocation for the uplink resource, among other examples.

In some aspects, a time domain allocation for the uplink resource may include an indication of a time domain resource, for the uplink resource, that occurs after a quantity of time domain resources from a slot in which the simplified SSB 134 is received in the cell 102b. For example, the time domain allocation may indicate a quantity #D slots/subslots/subframes after the slot number #S in which the UE 120 detects the simplified SSB 134 in the cell 102b (e.g., where #D is greater than 0).

In some aspects, a time domain allocation for the uplink resource may include an indication of a quantity of time domain resources (e.g., symbols, slots, subslots, subframes) for the uplink resource. The quantity of time domain resources may correspond to a time period or time duration of the uplink resource.

In some aspects, a frequency domain allocation for the uplink resource may include an indication to use, for the uplink resource, a frequency domain resource in which the simplified SSB 134 is received. The frequency domain resource may include one or more carriers, one or more frequency bands, one or more physical resource blocks (PRBs), one or more subcarriers, one or more resource elements (REs), and/or one or more frequency domain resources of another type.

In some aspects, a frequency domain allocation for the uplink resource may include an indication of a frequency domain resource for the uplink resource. The frequency domain resource for the uplink resource may be indicated relative to a frequency domain resource in which the simplified SSB 134 is received. For example, the frequency domain allocation may indicate that the frequency domain resource is a particular quantity of PRBs greater than the PRB number of the PRB in which the simplified SSB 134 is received. As another example, the frequency domain allocation may indicate that the frequency domain resource is a particular quantity of PRBs lesser than the PRB number of the PRB in which the simplified SSB 134 is received. As another example, the frequency domain allocation may indicate #A PRBs north or south of the last PRB in which the simplified SSB 134 is transmitted (alternatively #A=0).

In some aspects, a spatial domain allocation for the uplink resource may include an indication to use, for the uplink resource, a beam on which the simplified SSB 134 is received. In some aspects, a spatial domain allocation for the uplink resource may include an indication of beam for the uplink resource. The beam for the uplink resource is indicated relative to a beam on which the simplified SSB 134 is received. In some aspects, the spatial domain allocation for the uplink resource may include an indication to use the same beam as the simplified SSB 134 in addition to one or more additional beams (e.g., same beam and [—#B to +#B] beams adjacent to the beam in which the simplified SSB 134 is detected (alternatively #B=0)).

In some aspects, a power allocation for the uplink resource may include an indication to use, for the uplink resource, a transmit power that is based at least in part on a reference signal received power (RSRP) of the simplified SSB 134. The UE 120 may measure the simplified SSB 134 and may determine the RSRP based at least in part on the measurement. The UE 120 may determine the RSRP in decibel-milliwatts (dBM) or another unit. In some aspects, a power allocation for the uplink resource may include an indication to use, for the uplink resource, a transmit power that is based at least in part on the RSRP of the simplified SSB 134 plus a power delta value. For example, the UE 120 may determine the uplink transmit power for an uplink cell WUS or a RACH transmission in the uplink resource as the RSRP from the simplified SSB 134+ΔP [in dBm].

In some aspects, the configuration(s) in the downlink transmission include additional parameters, such as an indication of a sequence that is to be used for the uplink resource, an indication of a timer for consecutive uplink transmissions using the uplink resource, and/or, an indication of a contention resolution timer for the uplink resource, among other examples.

The sequence may include Zadoff-Chu parameters or parameters of any new sequence to be used for the uplink resource. The timer for uplink consecutive transmissions using the uplink resource may be indicated by an ul-cell-Wus-prohibit-timer IE in milliseconds, seconds, and/or another time unit. The timer may define the time between consecutive transmissions of uplink communications (e.g., consecutive uplink cell WUS transmissions, consecutive RACH transmissions) using the uplink resource.

In some aspects, an uplink cell WUS is used only from the very first UE 120 entering/camping in the cell 102b (e.g., after transmission of the simplified SSB 134). The network node 110b, upon reception of the first uplink cell WUS from a UE 120 in the cell 102b, the network node 110b starts transmitting a full SSB 132 with all the associated system information, then the network node 110a does not need to transmit any information related to contention in the cell 102b (e.g., no physical downlink shared channel (PDSCH)/physical uplink shared channel (PUSCH) traffic nor other UEs camped in the cell).

In some aspects, and uplink cell WUS can be used from UEs in the cell 102b, even if there is PDSCH/PUSCH traffic in the cell 102b, or even if there are other UEs in idle/inactive mode in the cell 102b. In these aspects, the network node 110a may transmit (in addition to the other IEs discussed above), information with regards to contention resolution. This may include the contention resolution timer described above. The contention resolution timer may be indicated in an ul-cell-wus-ContentionResolutionTimer IE, 27 28

ENUMERATED {sf8, sf16, sf24, sf32, sf40, sf48, sf56, sf64, sf128, sf256, sf512, sf1024}.

In some aspects, an uplink cell WUS may be used as a special form of RACH transmission. In these aspects, the RACH configuration for RACH transmissions may serve as the configuration for uplink cell WUS in the same manner as the uplink cell WUS configuration. In other words, in these aspects, the uplink cell WUS configuration may be replaced by RACH configuration.

As shown in FIGS. 7A and 7B, at 710, the network node 110$a$ may transmit, and the UE 120 may receive, the downlink transmission the cell 102$a$. The UE 120 may receive the downlink communication when the UE 120 is in an idle mode, in an inactive mode, and/or in a connected mode in the cell 102$a$.

It is to be noted that the example downlink transmission (e.g., the SIB1) illustrated in FIG. 7A is an example, and the configurations, mappings, and/or mapping tables described herein may be included in other types of downlink transmissions. For example, for UEs 120 in idle/inactive mode in the cell 102$a$, the mapping table between cell identifier or $$N_{ID}^2$$

and uplink cell WUS configuration or RACH configuration of the cells 102 transmitting light SSBs (e.g., simplified SSBs 134) can be broadcasted or otherwise transmitted in any SIB. As another example, for UEs 120 in connected mode in the cell 102$a$, the mapping table between cell identifier or $$N_{ID}^2$$

and uplink cell WUS configuration or RACH configuration of the cells 102 transmitting light SSBs (e.g., simplified SSBs 134) can be transmitted via any RRC or MAC-CE message.

For example, the UE 120 may receive the downlink transmission (which includes the indication of the mapping between the identifier and the uplink resource) in an RRC communication when the UE 120 is in an idle mode or in an inactive mode in the cells 102$a$. As another example, the UE 120 may receive the downlink transmission (which includes the indication of the mapping between the identifier and the uplink resource) in a MAC-CE communication when the UE 120 is in an RRC connected mode in the cell 102$a$. As another example, the UE 120 may receive the downlink transmission (which includes the indication of the mapping between the identifier and the uplink resource) in system information when the UE 120 is in an idle mode or in an inactive mode in the cell 102$a$. As another example, the UE 120 may receive the downlink transmission (which includes the indication of the mapping between the identifier and the uplink resource) in RRC signaling when the UE 120 is in RRC connected mode in the cell 102$a$.

As shown in FIGS. 7A and 7B, at 715, UE mobility may result in the UE 120 moving from the cell 102$a$ of the network node 110$a$ to the cell 102$b$ of the network node 110$b$. The UE 120 may receive the simplified SSB 134 in the cell 102$b$. As shown in FIGS. 7A and 7B, at 720, the UE 120 may transmit an uplink communication to the network node 110$b$ in the cell 102$b$. The UE 120 may identify the uplink resource for the uplink communication based at least in part on the mapping indicated in the downlink transmission received from the network node 110$a$ in the cell 102$a$. In particular, the UE 120 may identify the uplink resource for the uplink communication based on the mapping between the uplink resource and the identifier, associated with the network node 110$b$ and/or the cell 102$b$, identified based on the simplified SSB 134. Alternatively, the UE 120 may identify the uplink resource in a configuration that is included in a plurality of configurations preconfigured for the UE 120.

As indicated above, FIGS. 7A and 7B are provided as an example. Other examples may differ from what is described with regard to FIGS. 7A and 7B.

Figure 8A:
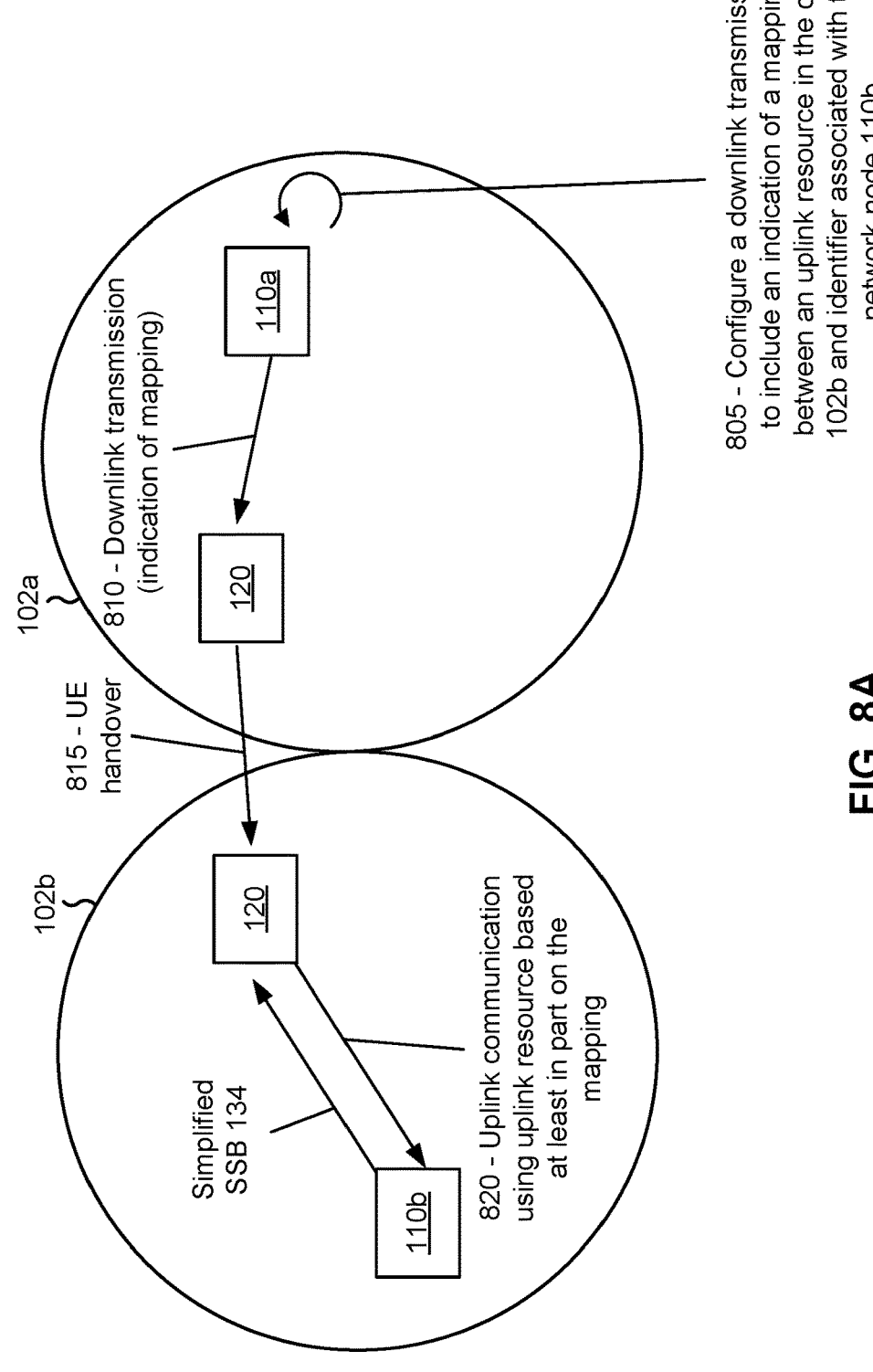

FIGS. 8A and 8B are diagrams illustrating an example 800 of identifying an uplink resource based at least in part on an uplink mapping, in accordance with the present disclosure. As shown in FIGS. 8A and 8B, the example 800 may include communication between a UE 120 and a plurality of network nodes 110, including a network node 110$a$ and a network node 110$b$. The UE 120 and the network nodes 110 may be included in a wireless network, such as the wireless network 100 described herein. Alternatively, the operations of the network nodes 110 described in connection with the example 800 may be performed by a CU 310, a DU 330, and/or an RU 340 in a disaggregated base station architecture 300 in the wireless network 100.

As shown in FIGS. 8A and 8B, at 805, the network node 110$a$ may configure a downlink transmission to include an indication of a mapping between an uplink resource in the cell 102$b$ and identifier associated with the network node 110$b$. As shown in FIGS. 8A and 8B, at 810, the network node 110$a$ may transmit (e.g., may broadcast, may multicast, may unicast) the downlink transmission to the UE 120 when the UE 120 is in the cell 102$a$. As shown in FIGS. 8A and 8B, at 815, a handover of the UE 120 from the cell 102$a$ to the cell 102$b$ may occur. Subsequently, the UE 120 may receive the simplified SSB 134 in the cell 102$b$ from the network node 110$b$.

The network node 110$a$ may configure the downlink transmission at 805 and may transmit the downlink transmission at 810 in a similar manner as at 705 and 710, respectively, described in connection with FIGS. 7A and 7B. However, the downlink transmission may be a type of downlink transmission that is associated with the handover of the UE at 815.

For example, the network node 110$a$ may configure a handover command to include the mapping, a mapping table that includes a plurality of mappings, an uplink cell WUS configuration, and/or a RACH configuration. The network node 110$a$ may transmit the handover command to the UE 120 on an Xn application (XnAP) interface in the cell 102$a$. As another example, the network node 110$a$ may configure an RRC reconfiguration communication (RRCReConfiguration) to include to include the mapping, a mapping table that includes a plurality of mappings, an uplink cell WUS configuration, and/or a RACH configuration. The network node 110$a$ may transmit the RRC reconfiguration communication to the UE 120 in the cell 102$a$. As another example, the network node 110$a$ may configure an RRC reconfiguration complete communication (RRCReConfiguration-Complete) to include to include the mapping, a mapping table that includes a plurality of mappings, an uplink cell WUS configuration, and/or a RACH configuration. The network node 110$a$ may transmit the RRC reconfiguration complete communication to the UE 120 in the cell 102$a$. As another example, the network node 110$a$ may configure an RRC connection setup complete communication (RRCConnectionSetupComplete) to include to include the mapping, a mapping table that includes a plurality of mappings, an uplink cell WUS configuration, and/or a RACH configuration. The network node 110a may transmit the RRC connection setup complete communication to the UE 120 in the cell 102a.

Additionally and/or alternatively, the UE 120 may receive the mapping, a mapping table that includes a plurality of mappings, an uplink cell WUS configuration, and/or a RACH configuration from the network node 110b in the cell 102b in connection with the handover. For example, the network node 110b may configure an RRC reconfiguration complete communication (RRCReConfigurationComplete) to include to include the mapping, a mapping table that includes a plurality of mappings, an uplink cell WUS configuration, and/or a RACH configuration. The network node 110b may transmit the RRC connection setup complete communication to the UE 120 in the cell 102b in connection with the handover. As another example, the network node 110b may configure an RRC reestablishment complete communication (RRCReestablishmentComplete) to include to include the mapping, a mapping table that includes a plurality of mappings, an uplink cell WUS configuration, and/or a RACH configuration. The network node 110b may transmit the RRC reestablishment complete communication to the UE 120 in the cell 102b in connection with the handover.

As shown in FIGS. 8A and 8B, at 820, the UE 120 may transmit an uplink communication to the network node 110b using the uplink resource based at least in part on the mapping indicated in the downlink transmission received from the network node 110a and/or in the downlink communication received from the network node 110b. If the simplified SSB 134 includes PSS 515 only, the UE 120 may acquire or determine a PSS identifier (e.g., an $$N_{ID}^{2}$$

identifier) based at least in part on the PSS 515 of the simplified SSB 134. In particular, the UE 120 may identify the uplink resource that is associated with the PSS identifier determined from the PSS 515 of the simplified SSB 134.

If the simplified SSB 134 includes only a PSS 515 and an SSS 520 (e.g., no PBCH 525), the UE 120 may acquire or determine the PSS identifier associated with the PSS 515 and an SSS identifier (e.g., an $$N_{ID}^{1}$$

identifier) based at least in part on the SSS 520 of the simplified SSB 134. The UE 120 may determine a cell identifier (e.g., an $$N_{ID}^{Cell}$$

identifier) associated with the network node 110 and/or the cell 102 based at least in part on the PSS identifier and the SSS identifier. The UE 120 may identify, based at least in part on the mapping, the uplink resource that is associated with the cell identifier.

As indicated above, FIGS. 8A and 8B are provided as an example. Other examples may differ from what is described with regard to FIGS. 8A and 8B.

Figure 9:
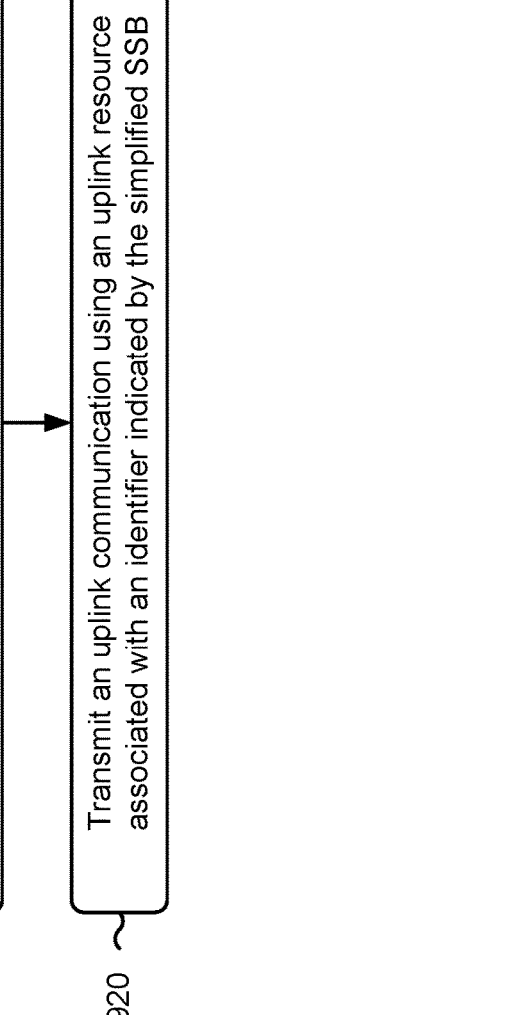
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with an uplink resource mapping for simplified SSB cells.

As shown in FIG. 9, in some aspects, process 900 may include receiving a simplified SSB (block 910). For example, the UE (e.g., using communication manager 140 and/or reception component 1202, depicted in FIG. 12) may receive a simplified synchronization signal block (SSB), as described above.

As further shown in FIG. 9, in some aspects, process 900 may include transmitting an uplink communication using an uplink resource associated with an identifier indicated by the simplified SSB (block 920). For example, the UE (e.g., using communication manager 140 and/or transmission component 1204, depicted in FIG. 12) may transmit an uplink communication using an uplink resource associated with an identifier indicated by the simplified SSB, as described above.

Process 900 may include additional aspects, such as any single aspect or any combination of aspects described below and/or in connection with one or more other processes described elsewhere herein.

In a first aspect, the simplified SSB comprises only a PSS, and wherein the identifier comprises a PSS identifier associated with the PSS.

In a second aspect, alone or in combination with the first aspect, the simplified SSB comprises only a PSS and a SSS, and wherein the identifier comprises a cell identifier of a network node that is associated with the simplified SSB.

In a third aspect, alone or in combination with one or more of the first and second aspects, the uplink communication comprises an uplink cell WUS.

In a fourth aspect, alone or in combination with one or more of the first through third aspects, the uplink communication comprises a random access channel (RACH) transmission.

In a fifth aspect, alone or in combination with one or more of the first through fourth aspects, process 900 includes identifying the uplink resource based at least in part on a mapping between the identifier and the uplink resource.

In a sixth aspect, alone or in combination with one or more of the first through fifth aspects, process 900 includes receiving, in a first cell, an indication of a mapping between the identifier and the uplink resource, wherein the one or more processors, to receive the simplified SSB, are configured to receiving the simplified SSB in a second cell.

In a seventh aspect, alone or in combination with one or more of the first through sixth aspects, process 900 includes receiving the indication of the mapping in a RRC communication when the UE is in an idle mode or in an inactive mode in the first cell.

In an eighth aspect, alone or in combination with one or more of the first through seventh aspects, process 900 includes receiving the indication of the mapping in a MAC-CE communication when the UE is in a RRC connected mode in the first cell.

In a ninth aspect, alone or in combination with one or more of the first through eighth aspects, process 900 includes receiving the indication of the mapping in system information when the UE is in an idle mode or in an inactive mode in the first cell.

In a tenth aspect, alone or in combination with one or more of the first through ninth aspects, process 900 includes receiving the indication of the mapping in dedicated RRC signaling when the UE is in an RRC connected mode in the first cell.

In an eleventh aspect, alone or in combination with one or more of the first through tenth aspects, process 900 includes receiving an indication of a mapping table that includes at least one of a mapping between a primary synchronization signal (PSS) identifier and the uplink resource, or a mapping between a cell identifier and the uplink resource, wherein the identifier comprises at least one of the PSS identifier or the cell identifier.

In a twelfth aspect, alone or in combination with one or more of the first through eleventh aspects, process 900 includes receiving the indication of the mapping table in a SIB.

In a thirteenth aspect, alone or in combination with one or more of the first through twelfth aspects, process 900 includes receiving the indication of the mapping table in a RACH configuration IE in the SIB.

In a fourteenth aspect, alone or in combination with one or more of the first through thirteenth aspects, process 900 includes receiving the indication of the mapping table in an uplink cell WUS configuration IE in the SIB.

In a fifteenth aspect, alone or in combination with one or more of the first through fourteenth aspects, process 900 includes receiving the indication of the mapping table in an AdditionalRACH-Config-r17 IE in the SIB.

In a sixteenth aspect, alone or in combination with one or more of the first through fifteenth aspects, process 900 includes receiving the indication of the mapping table in a handover command from a first cell that is different from a second cell from which the simplified SSB is received.

In a seventeenth aspect, alone or in combination with one or more of the first through sixteenth aspects, process 900 includes receiving the indication of the mapping table in a RRC reconfiguration communication from a first cell that is different from a second cell from which the simplified SSB is received.

In an eighteenth aspect, alone or in combination with one or more of the first through seventeenth aspects, process 900 includes receiving the indication of the mapping table in a RRC reconfiguration complete communication from a same cell from which the simplified SSB is received.

In a nineteenth aspect, alone or in combination with one or more of the first through eighteenth aspects, process 900 includes receiving the indication of the mapping table in a RRC reestablishment complete communication from a same cell from which the simplified SSB is received.

In a twentieth aspect, alone or in combination with one or more of the first through nineteenth aspects, process 900 includes receiving the indication of the mapping table in a RRC connection setup complete communication from a first cell that is different from a second cell from which the simplified SSB is received.

In a twenty-first aspect, alone or in combination with one or more of the first through twentieth aspects, process 900 includes receiving the indication of the mapping table in a RRC reconfiguration complete communication from a first cell that is different from a second cell from which the simplified SSB is received.

In a twenty-second aspect, alone or in combination with one or more of the first through twenty-first aspects, the uplink resource is indicated in a configuration, and wherein the configuration comprises at least one of a first indication of a time domain allocation for the uplink resource, a second indication of a frequency domain allocation for the uplink resource, a third indication of a spatial domain allocation for the uplink resource, or a fourth indication of a power allocation for the uplink resource.

In a twenty-third aspect, alone or in combination with one or more of the first through twenty-second aspects, the time domain allocation comprises an indication of a time domain resource, for the uplink resource, that occurs after a quantity of time domain resources from a slot in which the simplified SSB is received.

In a twenty-fourth aspect, alone or in combination with one or more of the first through twenty-third aspects, the time domain allocation comprises an indication of a quantity of time domain resources for the uplink resource.

In a twenty-fifth aspect, alone or in combination with one or more of the first through twenty-fourth aspects, the frequency domain allocation comprises an indication to use, for the uplink resource, a frequency domain resource in which the simplified SSB was received.

In a twenty-sixth aspect, alone or in combination with one or more of the first through twenty-fifth aspects, the frequency domain allocation comprises an indication of a frequency domain resource for the uplink resource, wherein the frequency domain resource for the uplink resource is indicated relative to a frequency domain resource in which the simplified SSB was received.

In a twenty-seventh aspect, alone or in combination with one or more of the first through twenty-sixth aspects, the spatial domain allocation comprises an indication to use, for the uplink resource, a beam on which the simplified SSB was received.

In a twenty-eighth aspect, alone or in combination with one or more of the first through twenty-seventh aspects, the spatial domain allocation comprises an indication of beam for the uplink resource, wherein the beam for the uplink resource is indicated relative to a beam on which the simplified SSB was received.

In a twenty-ninth aspect, alone or in combination with one or more of the first through twenty-eighth aspects, the power allocation comprises an indication to use, for the uplink resource, a transmit power that is based at least in part on an RSRP of the simplified SSB.

In a thirtieth aspect, alone or in combination with one or more of the first through twenty-ninth aspects, the power allocation comprises an indication to use, for the uplink resource, a transmit power that is based at least in part on an RSRP of the simplified SSB plus a power delta value.

In a thirty-first aspect, alone or in combination with one or more of the first through thirtieth aspects, the configuration comprises an indication of a sequence that is to be used for the uplink resource.

In a thirty-second aspect, alone or in combination with one or more of the first through thirty-first aspects, the configuration comprises an indication of a timer for consecutive transmissions of the uplink communication.

In a thirty-third aspect, alone or in combination with one or more of the first through thirty-second aspects, the configuration comprises an indication of a contention resolution timer for the uplink communication.

In a thirty-fourth aspect, alone or in combination with one or more of the first through thirty-third aspects, process 900 includes identifying the uplink resource in a configuration that is included in a plurality of configurations preconfigured for the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
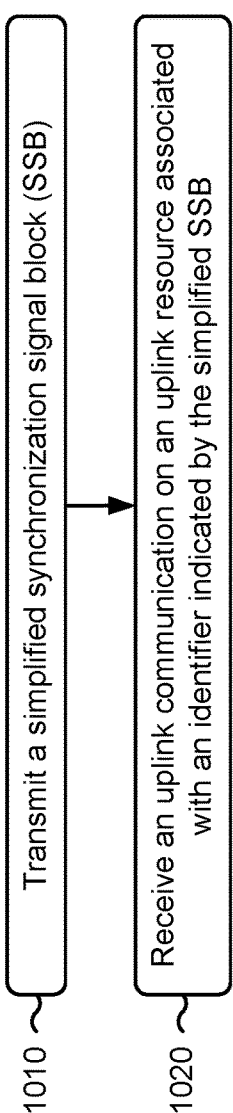
FIG. 10 is a diagram illustrating an example process performed, for example, by a network node, in accordance with the present disclosure.
Figure 10:

FIG. 10 is a diagram illustrating an example process 1000 performed, for example, by a network node, in accordance with the present disclosure. Example process 1000 is an example where the network node (e.g., network node 110) performs operations associated with an uplink resource mapping for simplified SSB cells.

As shown in FIG. 10, in some aspects, process 1000 may include transmitting a simplified SSB (block 1010). For example, the network node (e.g., using communication manager 150 and/or transmission component 1504, depicted in FIG. 15) may transmit a simplified SSB, as described above.

As further shown in FIG. 10, in some aspects, process 1000 may include receiving an uplink communication on an uplink resource associated with an identifier indicated by the simplified SSB (block 1020). For example, the network node 110 (e.g., using communication manager 150 and/or reception component 1502, depicted in FIG. 15) may receive an uplink communication on an uplink resource associated with an identifier indicated by the simplified SSB, as described above.

Process 1000 may include additional aspects, such as any single aspect or any combination of aspects described below and/or in connection with one or more other processes described elsewhere herein.

In a first aspect, the simplified SSB comprises only a primary synchronization signal (PSS), and wherein the identifier comprises a PSS identifier associated with the PSS.

In a second aspect, alone or in combination with the first aspect, the simplified SSB comprises only a PSS and an SSS, and wherein the identifier comprises a cell identifier associated with the apparatus.

In a third aspect, alone or in combination with one or more of the first and second aspects, the uplink communication comprises an uplink cell WUS.

In a fourth aspect, alone or in combination with one or more of the first through third aspects, the uplink communication comprises a RACH transmission.

In a fifth aspect, alone or in combination with one or more of the first through fourth aspects, process 1000 includes transmitting in an RRC reconfiguration complete communication, an indication of a mapping between the identifier and the uplink resource.

In a sixth aspect, alone or in combination with one or more of the first through fifth aspects, process 1000 includes transmitting, in an RRC reestablishment complete communication, an indication of a mapping between the identifier and the uplink resource.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
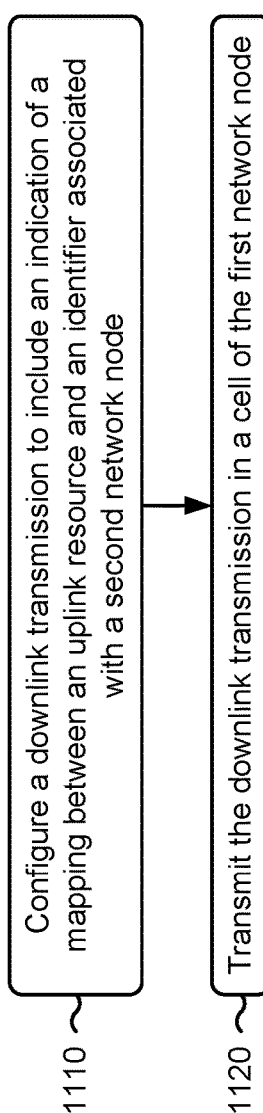
FIG. 11 is a diagram illustrating an example process performed, for example, by a first network node, in accordance with the present disclosure.
Figure 11:

FIG. 11 is a diagram illustrating an example process 1100 performed, for example, by a first network node, in accordance with the present disclosure. Example process 1100 is an example where the first network node (e.g., a first network node 110) performs operations associated with an uplink resource mapping for simplified SSB cells.

As shown in FIG. 11, in some aspects, process 1100 may include configuring a downlink transmission to include an indication of a mapping between an uplink resource and an identifier associated with a second network node (block 1110). For example, the first network node (e.g., using communication manager 150 and/or configuration component 1808, depicted in FIG. 18) may configure a downlink transmission to include an indication of a mapping between an uplink resource and an identifier associated with a second network node, as described above.

As further shown in FIG. 11, in some aspects, process 1100 may include transmitting the downlink transmission in a cell of the first network node (block 1120). For example, the first network node (e.g., using communication manager 150 and/or transmission component 1804, depicted in FIG. 18) may transmit the downlink transmission in a cell of the first network node, as described above.

Process 1100 may include additional aspects, such as any single aspect or any combination of aspects described below and/or in connection with one or more other processes described elsewhere herein.

In a first aspect, the identifier comprises a primary synchronization signal (PSS) identifier associated with the second network node.

In a second aspect, alone or in combination with the first aspect, the identifier comprises a cell identifier associated with the second network node.

In a third aspect, alone or in combination with one or more of the first and second aspects, the uplink resource comprises an uplink cell WUS resource.

In a fourth aspect, alone or in combination with one or more of the first through third aspects, the uplink resource comprises a RACH transmission resource.

In a fifth aspect, alone or in combination with one or more of the first through fourth aspects, the downlink transmission comprises an RRC communication.

In a sixth aspect, alone or in combination with one or more of the first through fifth aspects, the downlink transmission comprises a MAC-CE communication.

In a seventh aspect, alone or in combination with one or more of the first through sixth aspects, the downlink transmission comprises system information.

In an eighth aspect, alone or in combination with one or more of the first through seventh aspects, the downlink transmission comprises a system information block (SIB).

In a ninth aspect, alone or in combination with one or more of the first through eighth aspects, the mapping is indicated in a RACH configuration IE in the SIB.

In a tenth aspect, alone or in combination with one or more of the first through ninth aspects, the mapping is indicated in an uplink cell WUS configuration IE in the SIB.

In an eleventh aspect, alone or in combination with one or more of the first through tenth aspects, the mapping is indicated in an AdditionalRACH-Config-r17 IE in the SIB.

In a twelfth aspect, alone or in combination with one or more of the first through eleventh aspects, the downlink transmission comprises a handover command.

In a thirteenth aspect, alone or in combination with one or more of the first through twelfth aspects, the downlink transmission comprises an RRC reconfiguration communication.

In a fourteenth aspect, alone or in combination with one or more of the first through thirteenth aspects, the downlink transmission comprises an RRC connection setup complete communication.

In a fifteenth aspect, alone or in combination with one or more of the first through fourteenth aspects, the downlink transmission comprises an RRC reconfiguration complete communication.

In a sixteenth aspect, alone or in combination with one or more of the first through fifteenth aspects, the indication of the mapping is included in a mapping table in the downlink transmission.

In a seventeenth aspect, alone or in combination with one or more of the first through sixteenth aspects, the mapping table includes at least one of a mapping between the uplink resource and a PSS identifier associated with the second network node, or a mapping between the uplink resource and a cell identifier associated with the second network node.

In an eighteenth aspect, alone or in combination with one or more of the first through seventeenth aspects, the uplink resource is indicated in a configuration in the downlink transmission, and wherein the configuration comprises at least one of a first indication of a time domain allocation for the uplink resource, a second indication of a frequency domain allocation for the uplink resource, a third indication of a spatial domain allocation for the uplink resource, or a fourth indication of a power allocation for the uplink resource.

In a nineteenth aspect, alone or in combination with one or more of the first through eighteenth aspects, the time domain allocation comprises an indication of a time domain resource, for the uplink resource, that occurs after a quantity of time domain resources from a slot in which the second network node is to transmit a simplified SSB.

In a twentieth aspect, alone or in combination with one or more of the first through nineteenth aspects, the time domain allocation comprises an indication of a quantity of time domain resources for the uplink resource.

In a twenty-first aspect, alone or in combination with one or more of the first through twentieth aspects, the frequency domain allocation comprises an indication to use, for the uplink resource, a frequency domain resource in which the second network node is to transmit a simplified SSB.

In a twenty-second aspect, alone or in combination with one or more of the first through twenty-first aspects, the frequency domain allocation comprises an indication of a frequency domain resource for the uplink resource, wherein the frequency domain resource for the uplink resource is indicated relative to a frequency domain resource in which the second network node is to transmit a simplified SSB.

In a twenty-third aspect, alone or in combination with one or more of the first through twenty-second aspects, the spatial domain allocation comprises an indication to use, for the uplink resource, a beam on which the second network node is to transmit a simplified SSB.

In a twenty-fourth aspect, alone or in combination with one or more of the first through twenty-third aspects, the spatial domain allocation comprises an indication of beam for the uplink resource, wherein the beam for the uplink resource is indicated relative to a beam on which the second network node is to transmit a simplified SSB.

In a twenty-fifth aspect, alone or in combination with one or more of the first through twenty-fourth aspects, the power allocation comprises an indication to use, for the uplink resource, a transmit power that is based at least in part on an RSRP of a simplified SSB associated with the second network node.

In a twenty-sixth aspect, alone or in combination with one or more of the first through twenty-fifth aspects, the power allocation comprises an indication to use, for the uplink resource, a transmit power that is based at least in part on an RSRP of a simplified SSB associated with the second network node plus a power delta value.

In a twenty-seventh aspect, alone or in combination with one or more of the first through twenty-sixth aspects, the configuration comprises an indication of a sequence that is to be used for the uplink resource.

In a twenty-eighth aspect, alone or in combination with one or more of the first through twenty-seventh aspects, the configuration comprises an indication of a timer for consecutive transmissions of an uplink communication that is to be transmitted using the uplink resource.

In a twenty-ninth aspect, alone or in combination with one or more of the first through twenty-eighth aspects, the configuration comprises an indication of a contention resolution timer for an uplink communication that is to be transmitted using the uplink resource.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
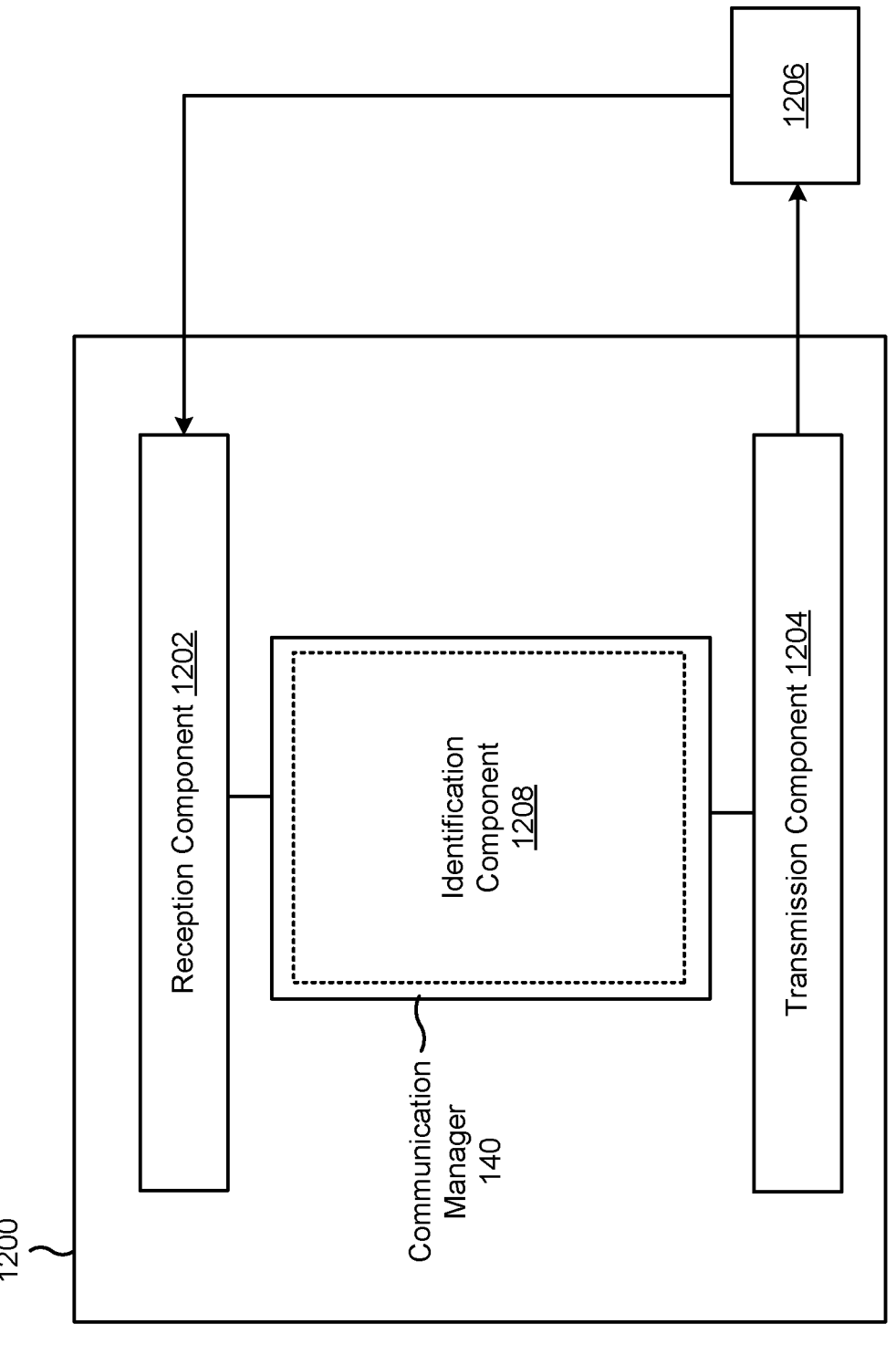
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE 120, or a UE 120 may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a network node, or another wireless communication device) using the reception component 1202 and the transmission component 1204. As further shown, the apparatus 1200 may include the communication manager 140. The communication manager 140 may include one or more of an identification component 1208, among other examples.

In some aspects, the apparatus 1200 may be configured to perform one or more operations described herein in connection with FIG. 6-8. Additionally, or alternatively, the apparatus 1200 may be configured to perform one or more processes described herein, such as process 900 of FIG. 9. In some aspects, the apparatus 1200 and/or one or more components shown in FIG. 12 may include one or more components of the UE 120 described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE 120 described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE 120 described in connection with FIG. 2. In some aspects, the transmission component 1204 may be co-located with the reception component 1202 in a transceiver.

The reception component 1202 may receive a SSB (e.g., from an apparatus 1206). The transmission component 1204 may transmit (e.g., to another apparatus 1206) an uplink communication using an uplink resource associated with an identifier indicated by the simplified SSB.

The identification component 1208 may identify the uplink resource based at least in part on a mapping between the identifier and the uplink resource. The reception component 1202 may receive, in a first cell, an indication of a mapping between the identifier and the uplink resource. The reception component 1202 may receive an indication of a mapping table that includes a mapping between a PSS identifier and the uplink resource. The reception component 1202 may receive an indication of a mapping table that includes a mapping between a cell identifier and the uplink resource. The identification component 1208 may identify the uplink resource in a configuration that is included in a plurality of configurations preconfigured for the UE.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
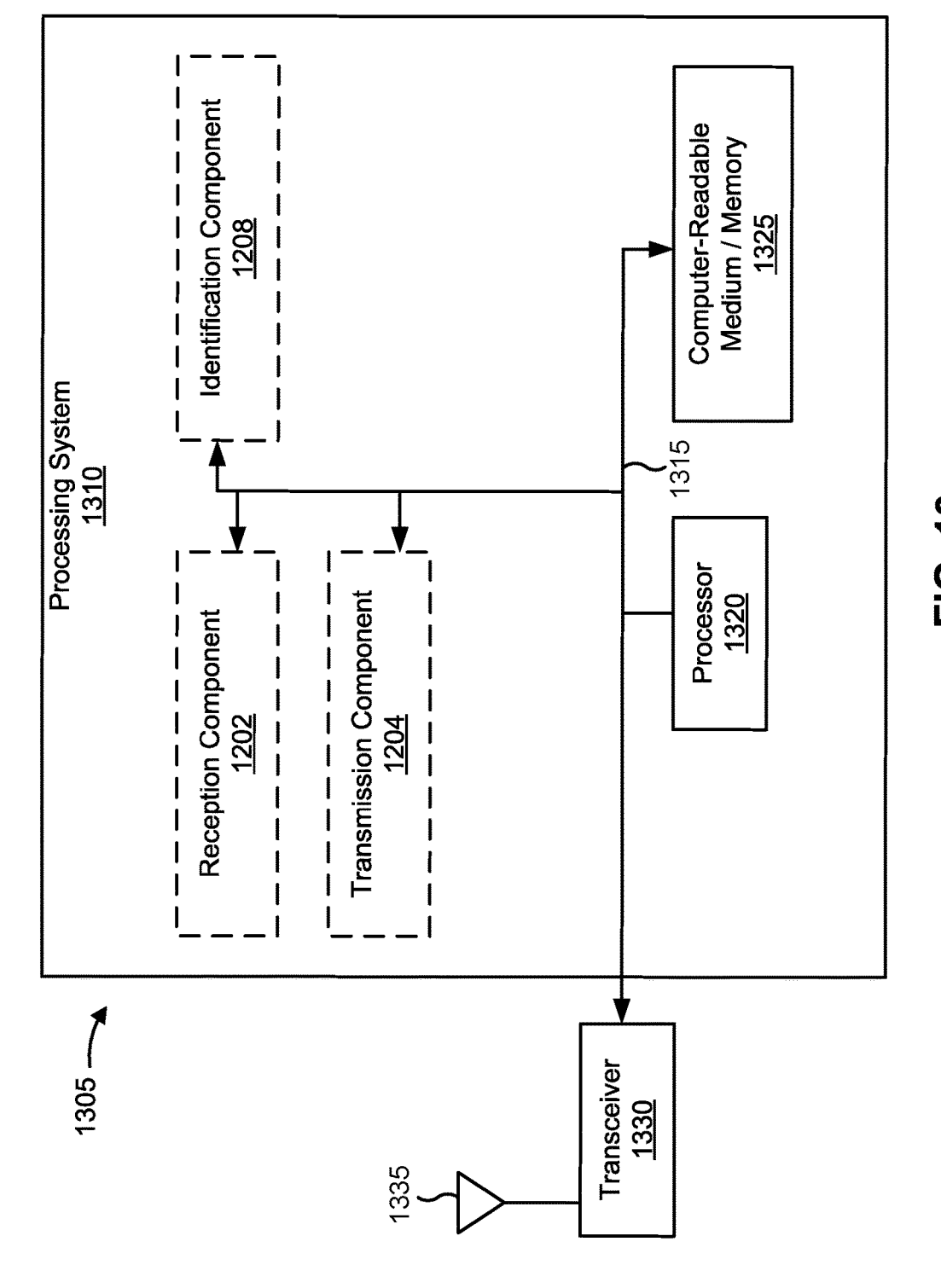
FIG. 13 is a diagram illustrating an example of a hardware implementation for an apparatus employing a processing system, in accordance with the present disclosure.

FIG. 13 is a diagram illustrating an example 1300 of a hardware implementation for an apparatus 1305 employing a processing system 1310, in accordance with the present disclosure. The apparatus 1305 may be a UE 120.

The processing system 1310 may be implemented with a bus architecture, represented generally by the bus 1315. The bus 1315 may include any number of interconnecting buses and bridges depending on the specific application of the processing system 1310 and the overall design constraints. The bus 1315 links together various circuits including one or more processors and/or hardware components, represented by the processor 1320, the illustrated components, and the computer-readable medium/memory 1325. The bus 1315 may also link various other circuits, such as timing sources, peripherals, voltage regulators, and/or power management circuits.

The processing system 1310 may be coupled to a transceiver 1330. The transceiver 1330 is coupled to one or more antennas 1335. The transceiver 1330 provides a means for communicating with various other apparatuses over a transmission medium. The transceiver 1330 receives a signal from the one or more antennas 1335, extracts information from the received signal, and provides the extracted information to the processing system 1310, specifically the reception component 1202. In addition, the transceiver 1330 receives information from the processing system 1310, specifically the transmission component 1204, and generates a signal to be applied to the one or more antennas 1335 based at least in part on the received information.

The processing system 1310 includes a processor 1320 coupled to a computer-readable medium/memory 1325. The processor 1320 is responsible for general processing, including the execution of software stored on the computer-readable medium/memory 1325. The software, when executed by the processor 1320, causes the processing system 1310 to perform the various functions described herein for any particular apparatus. The computer-readable medium/memory 1325 may also be used for storing data that is manipulated by the processor 1320 when executing software. The processing system further includes at least one of the illustrated components. The components may be software modules running in the processor 1320, resident/stored in the computer readable medium/memory 1325, one or more hardware modules coupled to the processor 1320, or some combination thereof.

In some aspects, the processing system 1310 may be a component of the UE 120 and may include the memory 282 and/or at least one of the TX MIMO processor 266, the RX processor 258, and/or the controller/processor 280. In some aspects, the apparatus 1305 for wireless communication includes means for receiving a simplified SSB and means for transmitting an uplink communication using an uplink resource that is associated with an identifier associated with the simplified SSB. The aforementioned means may be one or more of the aforementioned components of the apparatus 1200 and/or the processing system 1310 of the apparatus 1305 configured to perform the functions recited by the aforementioned means. As described elsewhere herein, the processing system 1310 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 13 is provided as an example. Other examples may differ from what is described in connection with FIG. 13.

Figure 14:
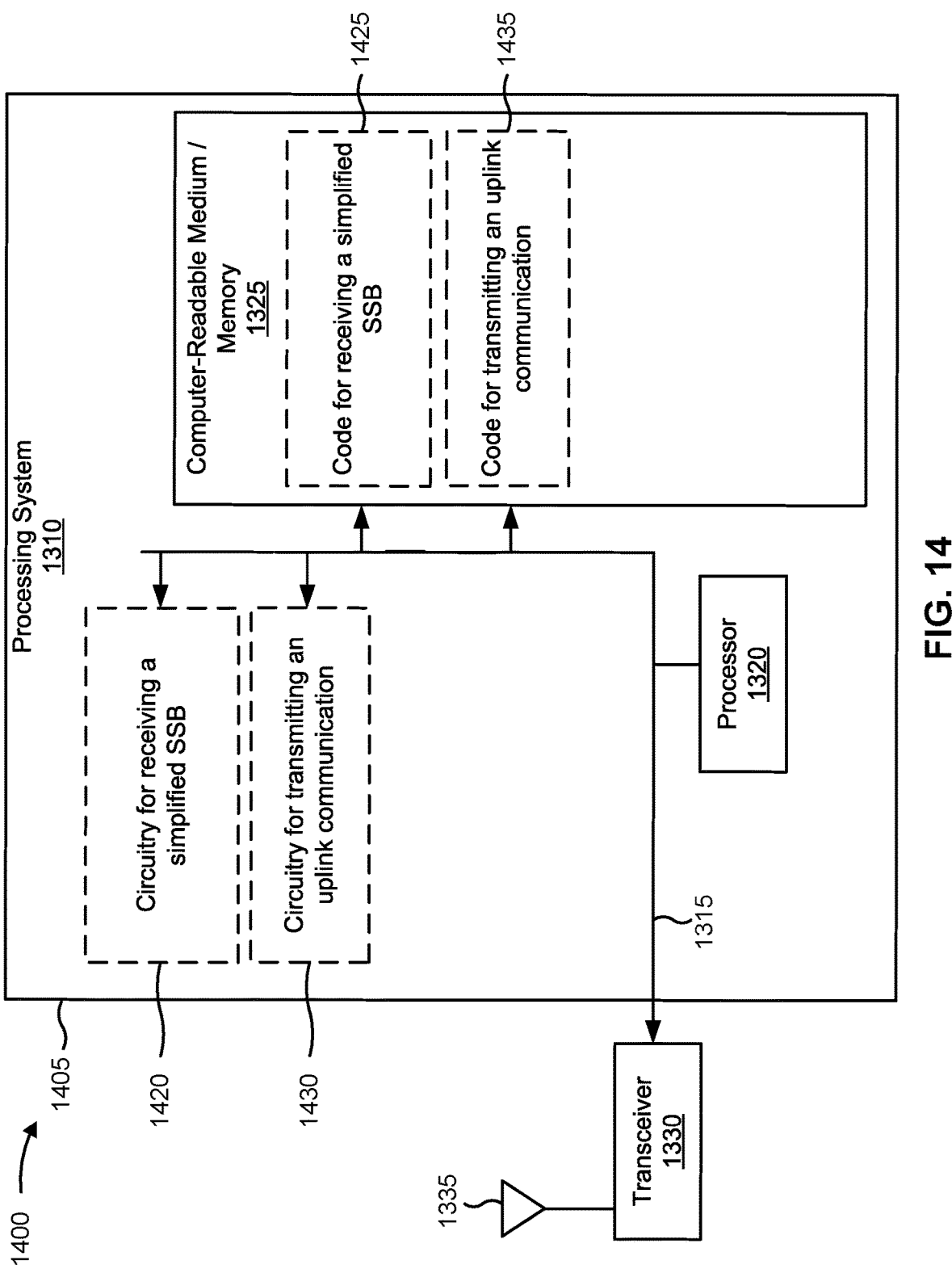
FIG. 14 is a diagram illustrating an example of an implementation of code and circuitry for an apparatus, in accordance with the present disclosure.

FIG. 14 is a diagram illustrating an example 1400 of an implementation of code and circuitry for an apparatus 1405, in accordance with the present disclosure. The apparatus 1405 may be a UE 120, or a UE 120 may include the apparatus 1405.

As shown in FIG. 14, the apparatus 1405 may include circuitry for receiving a simplified SSB (circuitry 1420). For example, the circuitry 1420 may enable the apparatus 1405 to receive a simplified SSB.

As shown in FIG. 14, the apparatus 1405 may include, stored in computer-readable medium 1325, code for receiving a simplified SSB (code 1425). For example, the code 1425, when executed by processor 1320, may cause processor 1320 to cause transceiver 1330 to receive a simplified SSB.

As shown in FIG. 14, the apparatus 1405 may include circuitry for transmitting an uplink communication using an uplink resource associated with an identifier indicated by the simplified SSB (circuitry 1430). For example, the circuitry 1430 may enable the apparatus 1405 to transmit an uplink communication using an uplink resource associated with an identifier indicated by the simplified SSB.

As shown in FIG. 14, the apparatus 1405 may include, stored in computer-readable medium 1325, code for transmitting an uplink communication using an uplink resource associated with an identifier indicated by the simplified SSB (code 1435). For example, the code 1435, when executed by processor 1320, may cause processor 1320 to cause transceiver 1330 to transmit an uplink communication using an uplink resource associated with an identifier indicated by the simplified SSB.

FIG. 14 is provided as an example. Other examples may differ from what is described in connection with FIG. 14.

Figure 15:
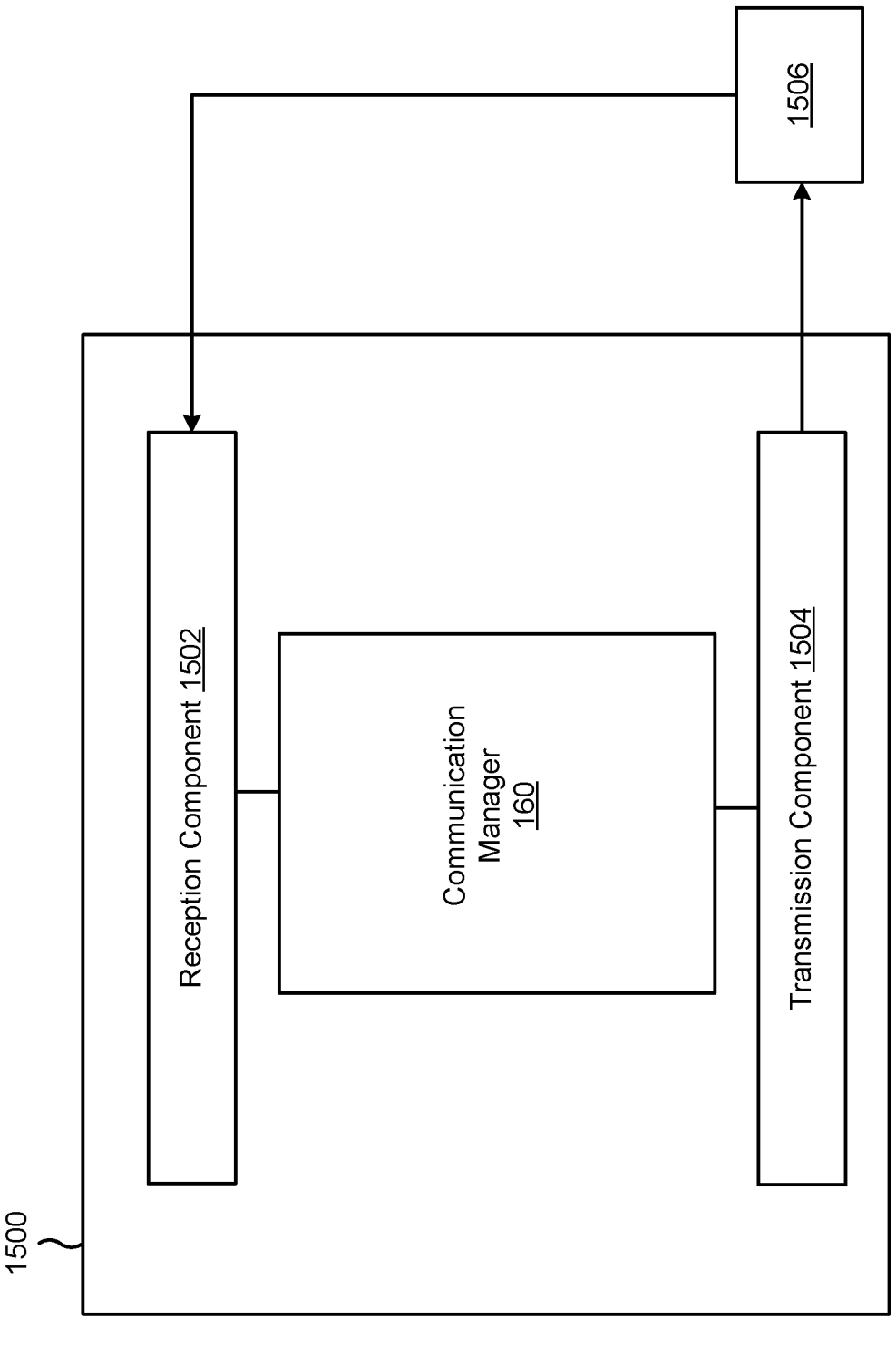
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a network node 110, or a network node 110 may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a network node, or another wireless communication device) using the reception component 1502 and the transmission component 1504. As further shown, the apparatus 1500 may include the communication manager 160.

In some aspects, the apparatus 1500 may be configured to perform one or more operations described herein in connection with FIG. 6-8. Additionally, or alternatively, the apparatus 1500 may be configured to perform one or more processes described herein, such as process 1000 of FIG. 10. In some aspects, the apparatus 1500 and/or one or more components shown in FIG. 15 may include one or more components of the network node 110 described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network node 110 described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the network node 110 described in connection with FIG. 2. In some aspects, the transmission component 1504 may be co-located with the reception component 1502 in a transceiver.

The transmission component 1504 may transmit a simplified SSB (e.g., to an apparatus 1506). The reception component 1502 may receive (e.g., from the apparatus 1506) an uplink communication on an uplink resource associated with an identifier indicated by the simplified SSB.

The transmission component 1504 may transmit, in an RRC reconfiguration complete communication, an indication of a mapping between the identifier and the uplink resource. The transmission component 1504 may transmit, in an RRC reestablishment complete communication, an indication of a mapping between the identifier and the uplink resource.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
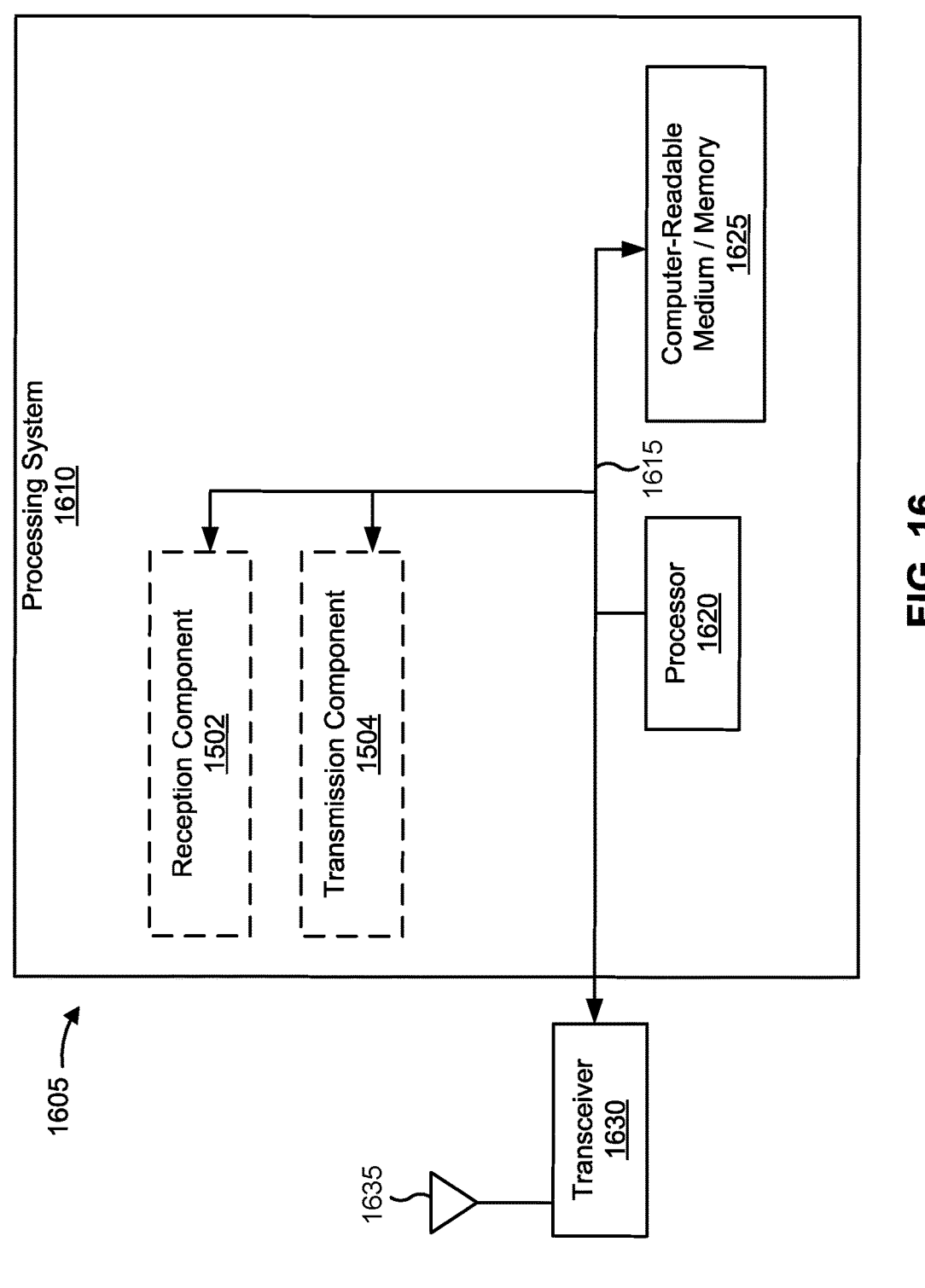
FIG. 16 is a diagram illustrating an example of a hardware implementation for an apparatus employing a processing system, in accordance with the present disclosure.

FIG. 16 is a diagram illustrating an example 1600 of a hardware implementation for an apparatus 1605 employing a processing system 1610, in accordance with the present disclosure. The apparatus 1605 may be a network node 110.

The processing system 1610 may be implemented with a bus architecture, represented generally by the bus 1615. The bus 1615 may include any number of interconnecting buses and bridges depending on the specific application of the processing system 1610 and the overall design constraints. The bus 1615 links together various circuits including one or more processors and/or hardware components, represented by the processor 1620, the illustrated components, and the computer-readable medium/memory 1625. The bus 1615 may also link various other circuits, such as timing sources, peripherals, voltage regulators, and/or power management circuits.

The processing system 1610 may be coupled to a transceiver 1630. The transceiver 1630 is coupled to one or more antennas 1635. The transceiver 1630 provides a means for communicating with various other apparatuses over a transmission medium. The transceiver 1630 receives a signal from the one or more antennas 1635, extracts information from the received signal, and provides the extracted information to the processing system 1610, specifically the reception component 1502. In addition, the transceiver 1630 receives information from the processing system 1610, specifically the transmission component 1504, and generates a signal to be applied to the one or more antennas 1635 based at least in part on the received information.

The processing system 1610 includes a processor 1620 coupled to a computer-readable medium/memory 1625. The processor 1620 is responsible for general processing, including the execution of software stored on the computer-readable medium/memory 1625. The software, when executed by the processor 1620, causes the processing system 1610 to perform the various functions described herein for any particular apparatus. The computer-readable medium/memory 1625 may also be used for storing data that is manipulated by the processor 1620 when executing software. The processing system further includes at least one of the illustrated components. The components may be software modules running in the processor 1620, resident/stored in the computer readable medium/memory 1625, one or more hardware modules coupled to the processor 1620, or some combination thereof.

In some aspects, the processing system 1610 may be a component of the network node 110 and may include the memory 242 and/or at least one of the TX MIMO processor 230, the RX processor 238, and/or the controller/processor 240. In some aspects, the apparatus 1605 for wireless communication includes means for transmitting a simplified SSB and means for receiving an uplink communication on an uplink resource associated with an identifier indicated by the simplified SSB. The aforementioned means may be one or more of the aforementioned components of the apparatus 1500 and/or the processing system 1610 of the apparatus 1605 configured to perform the functions recited by the aforementioned means. As described elsewhere herein, the processing system 1610 may include the TX MIMO processor 230, the receive processor 238, and/or the controller/ processor 240. In one configuration, the aforementioned means may be the TX MIMO processor 230, the receive processor 238, and/or the controller/processor 240 configured to perform the functions and/or operations recited herein.

FIG. 16 is provided as an example. Other examples may differ from what is described in connection with FIG. 16.

Figure 17:
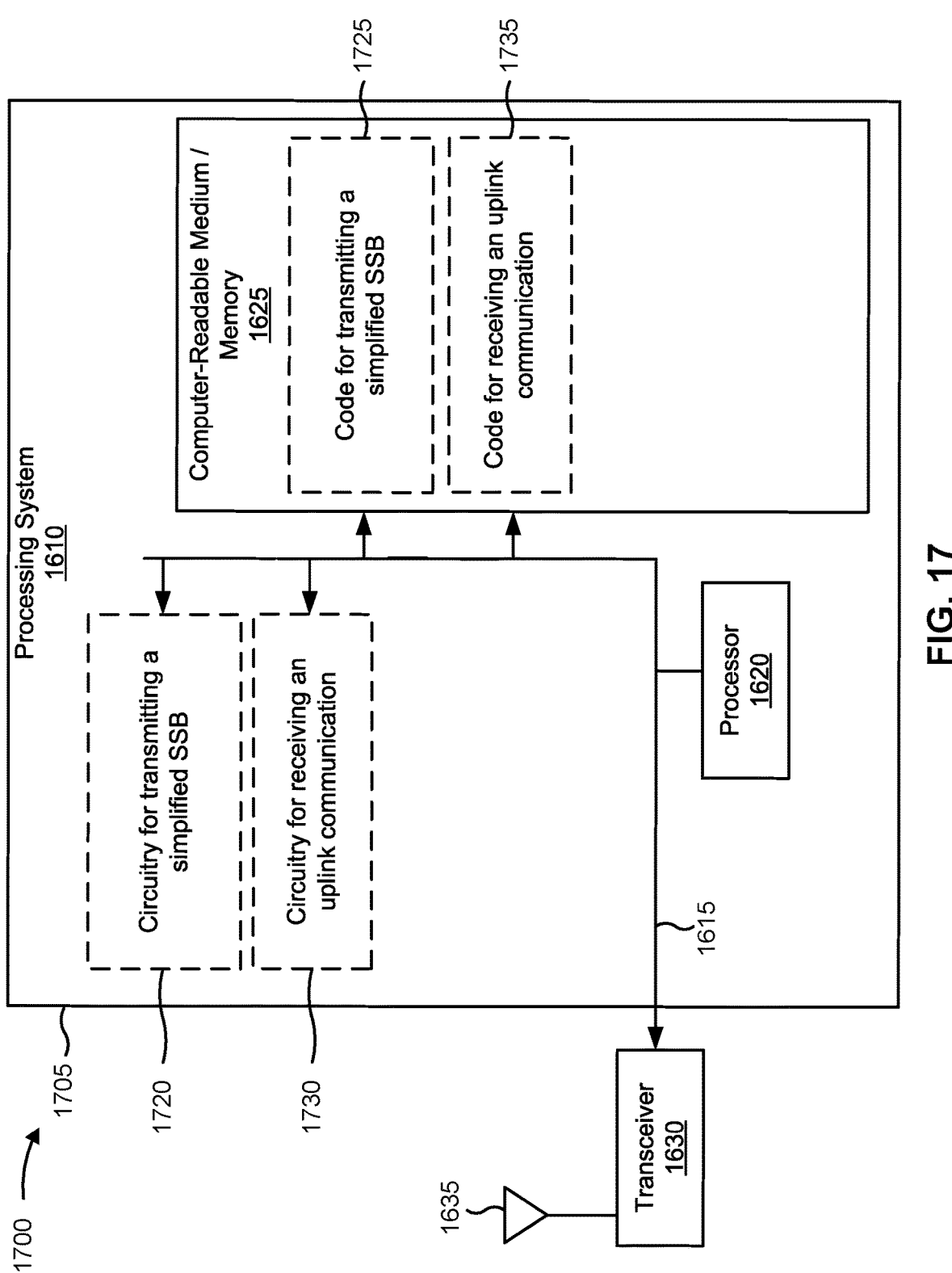
FIG. 17 is a diagram illustrating an example of an implementation of code and circuitry for an apparatus, in accordance with the present disclosure.

FIG. 17 is a diagram illustrating an example 1700 of an implementation of code and circuitry for an apparatus 1705, in accordance with the present disclosure. The apparatus 1705 may be a network node 110, or a network node 110 may include the apparatus 1705.

As shown in FIG. 17, the apparatus 1705 may include circuitry for transmitting a simplified SSB (circuitry 1720). For example, the circuitry 1720 may enable the apparatus 1705 to transmit a simplified SSB.

As shown in FIG. 17, the apparatus 1705 may include, stored in computer-readable medium 1625, code for transmitting a simplified SSB (code 1725). For example, the code 1725, when executed by processor 1620, may cause processor 1620 to cause transceiver 1630 to transmit a simplified SSB.

As shown in FIG. 17, the apparatus 1705 may include circuitry for receiving an uplink communication on an uplink resource associated with an identifier indicated by the simplified SSB (circuitry 1730). For example, the circuitry 1730 may enable the apparatus 1705 to receive an uplink communication on an uplink resource associated with an identifier indicated by the simplified SSB.

As shown in FIG. 17, the apparatus 1705 may include, stored in computer-readable medium 1625, code for receiving an uplink communication on an uplink resource associated with an identifier indicated by the simplified SSB (code 1735). For example, the code 1735, when executed by processor 1620, may cause processor 1620 to cause transceiver 1630 to receive an uplink communication on an uplink resource associated with an identifier indicated by the simplified SSB.

FIG. 17 is provided as an example. Other examples may differ from what is described in connection with FIG. 17.

Figure 18:
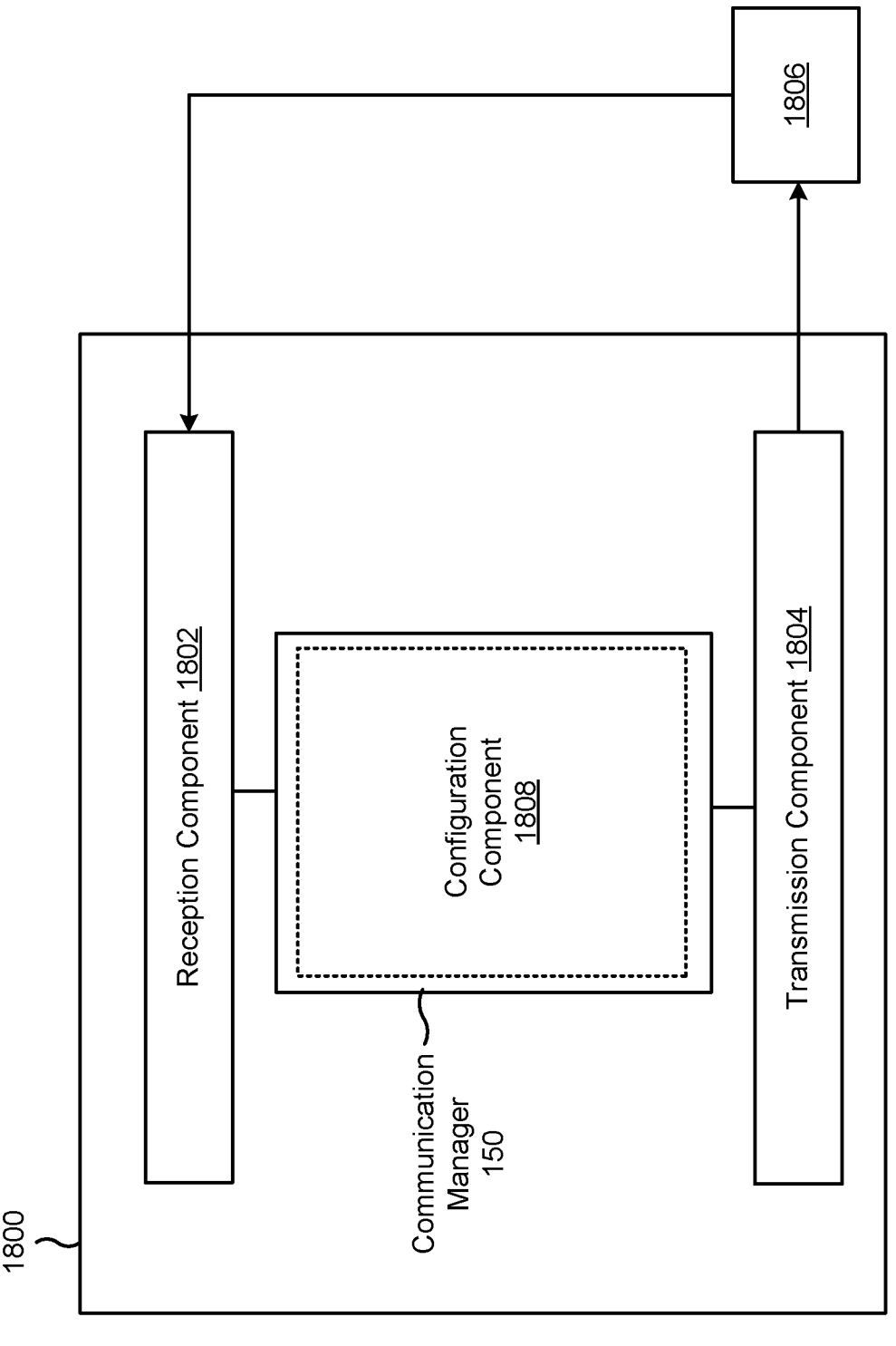
FIG. 18 is a diagram of an example apparatus for wireless communication, in accordance with the present disclosure.

FIG. 18 is a diagram of an example apparatus 1800 for wireless communication, in accordance with the present disclosure. The apparatus 1800 may be a network node 110, or a network node 110 may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a network node, or another wireless communication device) using the reception component 1802 and the transmission component 1804. As further shown, the apparatus 1800 may include the communication manager 150. The communication manager 150 may include one or more of a configuration component 1808, among other examples.

In some aspects, the apparatus 1800 may be configured to perform one or more operations described herein in connection with FIG. 6-8. Additionally, or alternatively, the apparatus 1800 may be configured to perform one or more processes described herein, such as process 1100 of FIG. 11. In some aspects, the apparatus 1800 and/or one or more components shown in FIG. 18 may include one or more components of the network node 110 described in connection with FIG. 2. Additionally, or alternatively, one or more components shown in FIG. 18 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1800. In some aspects, the reception component 1802 may include one or more antennas, a modem, a demodulator, a MIMO detector, a receive processor, a controller/processor, a memory, or a combination thereof, of the network node 110 described in connection with FIG. 2.

The transmission component 1804 may transmit communications, such as reference signals, control information, data communications, or a combination thereof, to the apparatus 1806. In some aspects, one or more other components of the apparatus 1800 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modem, a modulator, a transmit MIMO processor, a transmit processor, a controller/processor, a memory, or a combination thereof, of the network node 110 described in connection with FIG. 2. In some aspects, the transmission component 1804 may be co-located with the reception component 1802 in a transceiver.

The configuration component 1808 may configure a downlink transmission to include an indication of a mapping between an uplink resource and an identifier associated with an apparatus 1806. The transmission component 1804 may transmit the downlink transmission in a cell of the apparatus 1800.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

Figure 19:
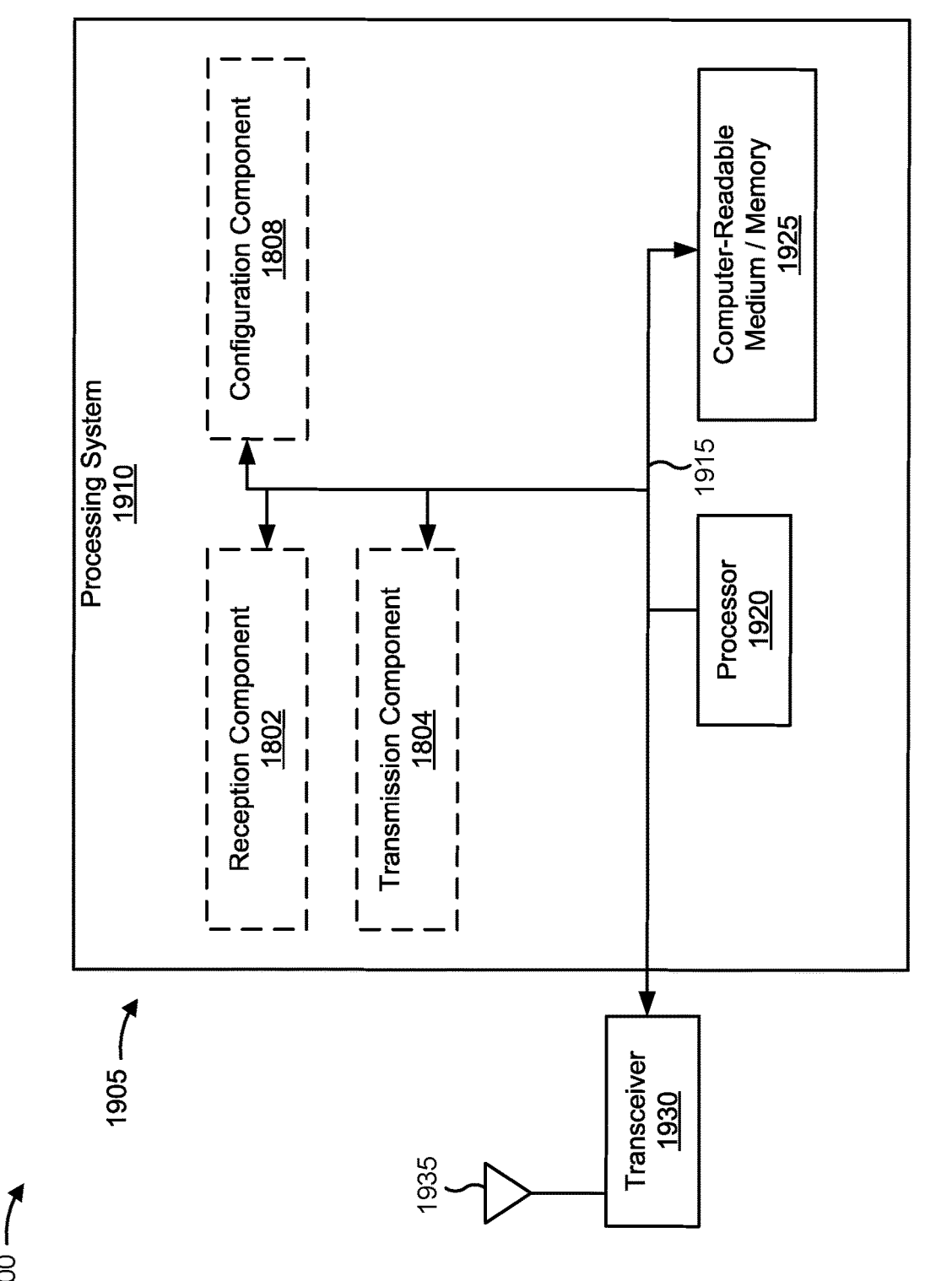
FIG. 19 is a diagram illustrating an example of a hardware implementation for an apparatus employing a processing system, in accordance with the present disclosure.

FIG. 19 is a diagram illustrating an example 1900 of a hardware implementation for an apparatus 1905 employing a processing system 1910, in accordance with the present disclosure. The apparatus 1905 may be a network node 110.

The processing system 1910 may be implemented with a bus architecture, represented generally by the bus 1915. The bus 1915 may include any number of interconnecting buses and bridges depending on the specific application of the processing system 1910 and the overall design constraints. The bus 1915 links together various circuits including one or more processors and/or hardware components, represented by the processor 1920, the illustrated components, and the computer-readable medium/memory 1925. The bus 1915 may also link various other circuits, such as timing sources, peripherals, voltage regulators, and/or power management circuits.

The processing system 1910 may be coupled to a transceiver 1930. The transceiver 1930 is coupled to one or more antennas 1935. The transceiver 1930 provides a means for communicating with various other apparatuses over a transmission medium. The transceiver 1930 receives a signal from the one or more antennas 1935, extracts information from the received signal, and provides the extracted information to the processing system 1910, specifically the reception component 1802. In addition, the transceiver 1930 receives information from the processing system 1910, specifically the transmission component 1804, and generates a signal to be applied to the one or more antennas 1935 based at least in part on the received information.

The processing system 1910 includes a processor 1920 coupled to a computer-readable medium/memory 1925. The processor 1920 is responsible for general processing, including the execution of software stored on the computer-readable medium/memory 1925. The software, when executed by the processor 1920, causes the processing system 1910 to perform the various functions described herein for any particular apparatus. The computer-readable medium/memory 1925 may also be used for storing data that is manipulated by the processor 1920 when executing software. The processing system further includes at least one of the illustrated components. The components may be software modules running in the processor 1920, resident/stored in the computer readable medium/memory 1925, one or more hardware modules coupled to the processor 1920, or some combination thereof.

In some aspects, the processing system 1910 may be a component of the network node 110 and may include the memory 242 and/or at least one of the TX MIMO processor 230, the RX processor 238, and/or the controller/processor 240. In some aspects, the apparatus 1905 for wireless communication includes means for configuring a downlink transmission to include an indication of a mapping between an uplink resource and an identifier associated with another apparatus and means for transmitting the downlink transmission in a cell of the apparatus 1905. The aforementioned means may be one or more of the aforementioned components of the apparatus 1800 and/or the processing system 1910 of the apparatus 1905 configured to perform the functions recited by the aforementioned means. As described elsewhere herein, the processing system 1910 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 19 is provided as an example. Other examples may differ from what is described in connection with FIG. 19.

Figure 20:
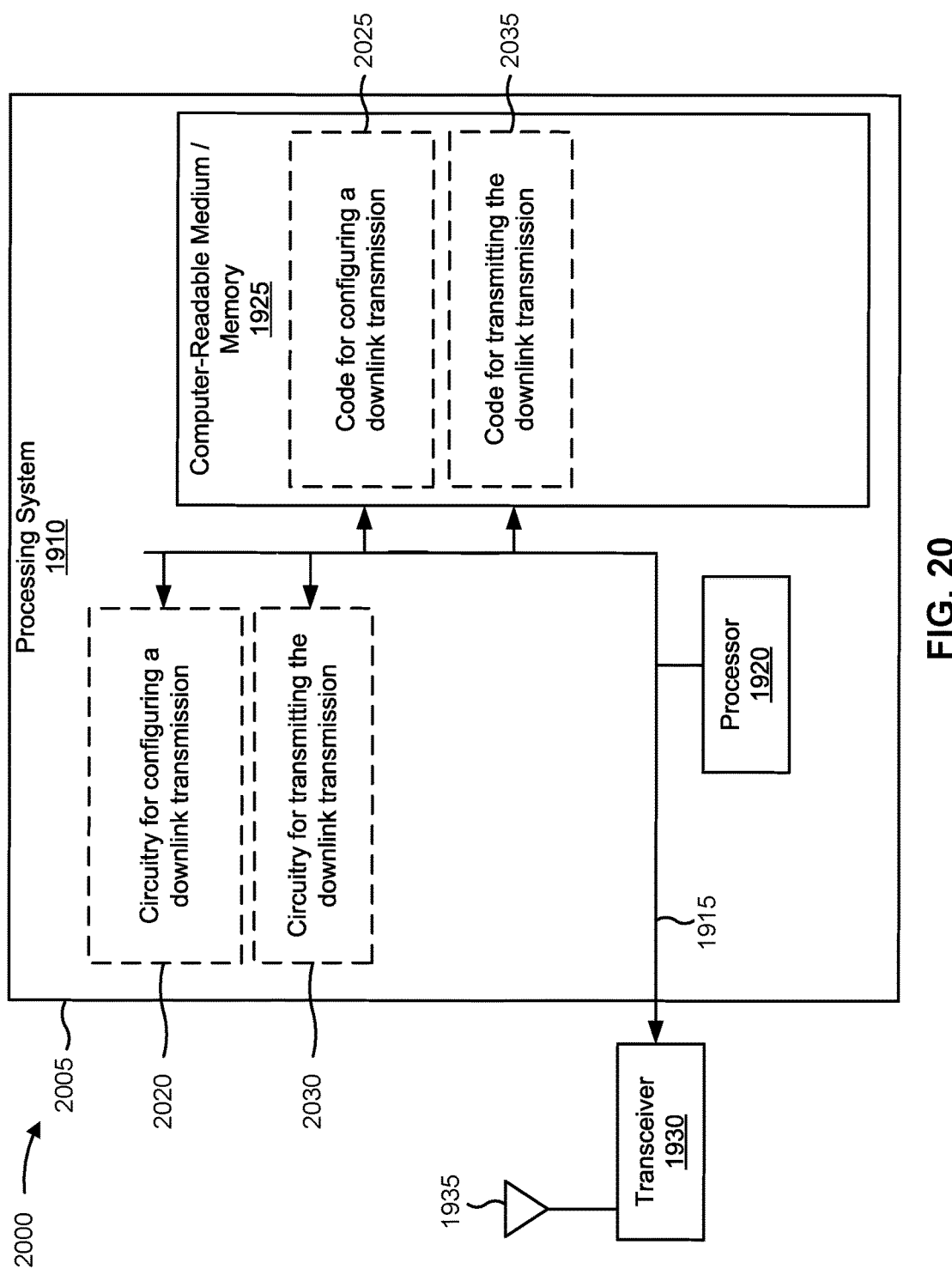
FIG. 20 is a diagram illustrating an example of an implementation of code and circuitry for an apparatus, in accordance with the present disclosure.

FIG. 20 is a diagram illustrating an example 2000 of an implementation of code and circuitry for an apparatus 2005, in accordance with the present disclosure. The apparatus 2005 may be a network node 110, or a network node 110 may include the apparatus 2005.

As shown in FIG. 20, the apparatus 2005 may include circuitry for configuring a downlink transmission to include an indication of a mapping between an uplink resource and an identifier associated with a second apparatus (circuitry 2020). For example, the circuitry 2020 may enable the apparatus 2005 to configure a downlink transmission to include an indication of a mapping between an uplink resource and an identifier associated with a second apparatus.

As shown in FIG. 20, the apparatus 2005 may include, stored in computer-readable medium 1925, code for configuring a downlink transmission to include an indication of a mapping between an uplink resource and an identifier associated with a second apparatus (code 2025). For example, the code 2025, when executed by processor 1920, may cause processor 1920 to configure a downlink transmission to include an indication of a mapping between an uplink resource and an identifier associated with a second apparatus.

As shown in FIG. 20, the apparatus 2005 may include circuitry for transmitting the downlink transmission in a cell of the first apparatus (circuitry 2030). For example, the circuitry 2030 may enable the apparatus 2005 to transmit the downlink transmission in a cell of the first apparatus.

As shown in FIG. 20, the apparatus 2005 may include, stored in computer-readable medium 1925, code for transmitting the downlink transmission in a cell of the first apparatus (code 2035). For example, the code 2035, when executed by processor 1920, may cause processor 1920 to cause transceiver 1930 to transmit the downlink transmission in a cell of the first apparatus.

FIG. 20 is provided as an example. Other examples may differ from what is described in connection with FIG. 20.

The following provides an overview of some Aspects of the present disclosure:

Aspect 1: A method of wireless communication performed by an apparatus, comprising: receiving a simplified synchronization signal block (SSB); and transmitting an uplink communication using an uplink resource associated with an identifier indicated by the simplified SSB.

Aspect 2: The method of Aspect 1, wherein the simplified SSB comprises only a primary synchronization signal (PSS); and wherein the identifier comprises a PSS identifier associated with the PSS.

Aspect 3: The method of any of Aspects 1-2, wherein the simplified SSB comprises only a primary synchronization signal (PSS) and a secondary synchronization signal (SSS); and wherein the identifier comprises a cell identifier of a network node that is associated with the simplified SSB.

Aspect 4: The method of any of Aspects 1-3, wherein the uplink communication comprises an uplink cell wake-up signal (WUS).

Aspect 5: The method of any of Aspects 1-4, wherein the uplink communication comprises a random access channel (RACH) transmission.

Aspect 6: The method of any of Aspects 1-5, further comprising: identifying the uplink resource based at least in part on a mapping between the identifier and the uplink resource.

Aspect 7: The method of any of Aspects 1-6, further comprising: receiving, in a first cell, an indication of a mapping between the identifier and the uplink resource.

Aspect 8: The method of Aspect 7, wherein receiving the simplified SSB comprises: receiving the simplified SSB in a second cell.

Aspect 9: The method of Aspect 7, wherein receiving the indication of the mapping in the first cell comprises: receiving the indication of the mapping in a radio resource control (RRC) communication when the apparatus is in an idle mode or in an inactive mode in the first cell.

Aspect 10: The method of Aspect 7, wherein receiving the indication of the mapping in the first cell comprises: receiving the indication of the mapping in a medium access control (MAC) control element (MAC-CE) communication when the apparatus is in a radio resource control (RRC) connected mode in the first cell.

Aspect 11: The method of Aspect 7, wherein receiving the indication of the mapping in the first cell comprises: receiving the indication of the mapping in system information when the apparatus is in an idle mode or in an inactive mode in the first cell.

Aspect 12: The method of Aspect 7, wherein receiving the indication of the mapping in the first cell comprises: receiving the indication of the mapping in dedicated radio resource control (RRC) signaling when the apparatus is in a radio resource control (RRC) connected mode in the first cell.

Aspect 13: The method of any of Aspects 1-12, further comprising: receiving an indication of a mapping table that includes a mapping between a primary synchronization signal (PSS) identifier and the uplink resource.

Aspect 14: The method of any of Aspects 1-13, further comprising: receiving an indication of a mapping table that includes a mapping between a cell identifier and the uplink resource.

Aspect 15: The method of Aspect 14, wherein receiving the indication of the mapping table comprises: receiving the indication of the mapping table in a system information block (SIB).

Aspect 16: The method of Aspect 14, wherein receiving the indication of the mapping table comprises: receiving the indication of the mapping table in a random access channel (RACH) configuration information element (IE) in the SIB.

Aspect 17: The method of Aspect 14, wherein receiving the indication of the mapping table comprises: receiving the indication of the mapping table in an uplink cell wake-up signal (WUS) configuration information element (IE) in the SIB.

Aspect 18: The method of Aspect 14, wherein receiving the indication of the mapping table comprises: receiving the indication of the mapping table in an AdditionalRACH-Config-r17 information element (IE) in the SIB.

Aspect 19: The method of Aspect 14, wherein receiving the indication of the mapping table comprises: receiving the indication of the mapping table in a handover command from a first cell that is different from a second cell from which the simplified SSB is received.

Aspect 20: The method of Aspect 14, wherein receiving the indication of the mapping table comprises: receiving the indication of the mapping table in a radio resource control (RRC) reconfiguration communication from a first cell that is different from a second cell from which the simplified SSB is received.

Aspect 21: The method of Aspect 14, wherein receiving the indication of the mapping table comprises: receiving the indication of the mapping table in a radio resource control (RRC) reconfiguration complete communication from a same cell from which the simplified SSB is received.

Aspect 22: The method of Aspect 14, wherein receiving the indication of the mapping table comprises: receiving the indication of the mapping table in a radio resource control (RRC) reestablishment complete communication from a same cell from which the simplified SSB is received.

Aspect 23: The method of Aspect 14, wherein receiving the indication of the mapping table comprises: receiving the indication of the mapping table in a radio resource control (RRC) connection setup complete communication from a first cell that is different from a second cell from which the simplified SSB is received.

Aspect 24: The method of Aspect 14, wherein receiving the indication of the mapping table comprises: receiving the indication of the mapping table in a radio resource control (RRC) reconfiguration complete communication from a first cell that is different from a second cell from which the simplified SSB is received.

Aspect 25: The method of any of Aspects 1-24, wherein the uplink resource is indicated in a configuration; and wherein the configuration comprises at least one of: a first indication of a time domain allocation for the uplink resource, a second indication of a frequency domain allocation for the uplink resource, a third indication of a spatial domain allocation for the uplink resource, or a fourth indication of a power allocation for the uplink resource.

Aspect 26: The method of Aspect 25, wherein the time domain allocation comprises an indication of a time domain resource, for the uplink resource, that occurs after a quantity of time domain resources from a slot in which the simplified SSB is received.

Aspect 27: The method of Aspect 25, wherein the time domain allocation comprises an indication of a quantity of time domain resources for the uplink resource.

Aspect 28: The method of Aspect 25, wherein the frequency domain allocation comprises an indication to use, for the uplink resource, a frequency domain resource in which the simplified SSB was received.

Aspect 29: The method of Aspect 25, wherein the frequency domain allocation comprises an indication of a frequency domain resource for the uplink resource, wherein the frequency domain resource for the uplink resource is indicated relative to a frequency domain resource in which the simplified SSB was received.

Aspect 30: The method of Aspect 25, wherein the spatial domain allocation comprises an indication to use, for the uplink resource, a beam on which the simplified SSB was received.

Aspect 31: The method of Aspect 25, wherein the spatial domain allocation comprises an indication of beam for the uplink resource, wherein the beam for the uplink resource is indicated relative to a beam on which the simplified SSB was received.

Aspect 32: The method of Aspect 25, wherein the power allocation comprises an indication to use, for the uplink resource, a transmit power that is based at least in part on a reference signal received power (RSRP) of the simplified SSB.

Aspect 33: The method of Aspect 25, wherein the power allocation comprises an indication to use, for the uplink resource, a transmit power that is based at least in part on a reference signal received power (RSRP) of the simplified SSB plus a power delta value.

Aspect 34: The method of Aspect 25, wherein the configuration comprises an indication of a sequence that is to be used for the uplink resource.

Aspect 35: The method of Aspect 25, wherein the configuration comprises an indication of a timer for consecutive transmissions of the uplink communication.

Aspect 36: The method of Aspect 25, wherein the configuration comprises an indication of a contention resolution timer for the uplink communication.

Aspect 37: The method of any of Aspects 1-36, further comprising: identifying the uplink resource in a configuration that is included in a plurality of configurations preconfigured for the apparatus.

Aspect 38: A method of wireless communication performed by an apparatus, comprising: transmitting a simplified synchronization signal block (SSB); and receiving an uplink communication on an uplink resource associated with an identifier indicated by the simplified SSB.

Aspect 39: The method of Aspect 38, wherein the simplified SSB comprises only a primary synchronization signal (PSS); and wherein the identifier comprises a PSS identifier associated with the PSS.

Aspect 40: The method of any of Aspects 38-39, wherein the simplified SSB comprises only a primary synchronization signal (PSS) and a secondary synchronization signal (SSS); and wherein the identifier comprises a cell identifier associated with the apparatus.

Aspect 41: The method of any of Aspects 38-40, wherein the uplink communication comprises an uplink cell wake-up signal (WUS).

Aspect 42: The method of any of Aspects 38-41, wherein the uplink communication comprises a random access channel (RACH) transmission.

Aspect 43: The method of any of Aspects 38-42, comprising: transmitting in a radio resource control (RRC) reconfiguration complete communication, an indication of a mapping between the identifier and the uplink resource.

Aspect 44: The method of any of Aspects 38-43, further comprising: transmitting, in a radio resource control (RRC) reestablishment complete communication, an indication of a mapping between the identifier and the uplink resource.

Aspect 45: A method of wireless communication performed by a first apparatus, comprising: configuring a downlink transmission to include an indication of a mapping between an uplink resource and an identifier associated with a second apparatus; and transmitting the downlink transmission in a cell of the first apparatus.

Aspect 46: The method of Aspect 45, wherein the identifier comprises a primary synchronization signal (PSS) identifier associated with the second apparatus.

Aspect 47: The method of any of Aspects 45-46, wherein the identifier comprises a cell identifier associated with the second apparatus.

Aspect 48: The method of any of Aspects 45-47, wherein the uplink resource comprises an uplink cell wake-up signal (WUS) resource.

Aspect 49: The method of any of Aspects 45-48, wherein the uplink resource comprises a random access channel (RACH) transmission resource.

Aspect 50: The method of any of Aspects 45-49, wherein the downlink transmission comprises a radio resource control (RRC) communication.

Aspect 51: The method of any of Aspects 45-50, wherein the downlink transmission comprises a medium access control (MAC) control element (MAC-CE) communication.

Aspect 52: The method of any of Aspects 45-51, comprises information.

Aspect 53: The method of any of Aspects 45-52, wherein the downlink transmission comprises a system information block (SIB).

Aspect 54: The method of Aspect 53, wherein the mapping is indicated in a random access channel (RACH) configuration information element (IE) in the SIB.

Aspect 55: The method of Aspect 53, wherein the mapping is indicated in an uplink cell wake-up signal (WUS) configuration information element (IE) in the SIB.

Aspect 56: The method of Aspect 53, wherein the mapping is indicated in an AdditionalRACH-Config-r17 information element (IE) in the SIB.

Aspect 57: The method of any of Aspects 45-56, wherein the downlink transmission comprises a handover command.

Aspect 58: The method of any of Aspects 45-57, wherein the downlink transmission comprises a radio resource control (RRC) reconfiguration communication.

Aspect 59: The method of any of Aspects 45-58, wherein the downlink transmission comprises a radio resource control (RRC) connection setup complete communication.

Aspect 60: The method of any of Aspects 45-59, wherein the downlink transmission comprises a radio resource control (RRC) reconfiguration complete communication.

Aspect 61: The method of any of Aspects 45-60, wherein the indication of the mapping is included in a mapping table in the downlink transmission.

Aspect 62: The method of Aspect 61, wherein the mapping table includes at least one of: a mapping between the uplink resource and a primary synchronization signal (PSS) identifier associated with the second apparatus, or a mapping between the uplink resource and a cell identifier associated with the second apparatus.

Aspect 63: The method of any of Aspects 45-62, wherein the uplink resource is indicated in a configuration in the downlink transmission; and wherein the configuration comprises at least one of: an indication of a time domain allocation for the uplink resource, an indication of a frequency domain allocation for the uplink resource, an indication of a spatial domain allocation for the uplink resource, or an indication of a power allocation for the uplink resource.

Aspect 64: The method of Aspect 63, wherein the time domain allocation comprises an indication of a time domain resource, for the uplink resource, that occurs after a quantity of time domain resources from a slot in which the second network node is to transmit a simplified synchronization signal block (SSB).

Aspect 65: The method of Aspect 63, wherein the time domain allocation comprises an indication of a quantity of time domain resources for the uplink resource.

Aspect 66: The method of Aspect 63, wherein the frequency domain allocation comprises an indication to use, for the uplink resource, a frequency domain resource in which the second network node is to transmit a simplified synchronization signal block (SSB).

Aspect 67: The method of Aspect 63, wherein the frequency domain allocation comprises an indication of a frequency domain resource for the uplink resource, comprising transmitting a simplified synchronization signal block (SSB).

Aspect 68: The method of Aspect 63, wherein the spatial domain allocation comprises an indication to use, for the uplink resource, a beam on which the second network node is to transmit a simplified synchronization signal block (SSB).

Aspect 69: The method of Aspect 63, wherein the spatial domain allocation comprises an indication of beam for the uplink resource, comprising transmitting a simplified synchronization signal block (SSB).

Aspect 70: The method of Aspect 63, wherein the power allocation comprises an indication to use, for the uplink resource, a transmit power that is based at least in part on a reference signal received power (RSRP) of a simplified synchronization signal block (SSB) associated with the second apparatus.

Aspect 71: The method of Aspect 63, wherein the power allocation comprises an indication to use, for the uplink resource, a transmit power that is based at least in part on a reference signal received power (RSRP) of a simplified synchronization signal block (SSB) associated with the second apparatus plus a power delta value.

Aspect 72: The method of Aspect 63, wherein the configuration comprises an indication of a sequence that is to be used for the uplink resource.

Aspect 73: The method of Aspect 63, wherein the configuration comprises an indication of a timer for consecutive transmissions of an uplink communication that is to be transmitted using the uplink resource.

Aspect 74: The method of Aspect 63, wherein the configuration comprises an indication of a contention resolution timer for an uplink communication that is to be transmitted using the uplink resource.

Aspect 75: An apparatus for wireless communication at a device, comprising a processor; memory coupled with the processor; and instructions stored in the memory and executable by the processor to cause the apparatus to perform the method of one or more of Aspects 1-74.

Aspect 76: A device for wireless communication, comprising a memory and one or more processors coupled to the memory, the one or more processors configured to perform the method of one or more of Aspects 1-74.

Aspect 77: An apparatus for wireless communication, comprising at least one means for performing the method of one or more of Aspects 1-74.

Aspect 78: A non-transitory computer-readable medium storing code for wireless communication, the code comprising instructions executable by a processor to perform the method of one or more of Aspects 1-74.

Aspect 79: A non-transitory computer-readable medium storing a set of instructions for wireless communication, the set of instructions comprising one or more instructions that, when executed by one or more processors of a device, cause the device to perform the method of one or more of Aspects 1-74.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors coupled to the one or more memories, the one or more processors configured to cause the UE to:
receive a simplified synchronization signal block (SSB) in a cell; and
transmit an uplink communication via an uplink resource for initial access or uplink wake-up signal transmission in the cell, wherein the uplink resource is identified by an identifier indicated by the simplified SSB.

2. The apparatus of claim 1,
wherein the simplified SSB comprises only a primary synchronization signal (PSS); and
wherein the identifier comprises a PSS identifier associated with the PSS.

3. The apparatus of claim 1,
wherein the simplified SSB comprises only a primary synchronization signal (PSS) and a secondary synchronization signal (SSS); and
wherein the identifier comprises a cell identifier of a network node that is associated with the simplified SSB.

4. The apparatus of claim 1,
wherein the uplink communication comprises at least one of:
an uplink wake-up signal (WUS), or
a random access channel (RACH) transmission.

5. The apparatus of claim 1,
wherein the one or more processors are further configured to cause the UE to:
identify the uplink resource based at least in part on a mapping between the identifier and the uplink resource.

6. The apparatus of claim 1,
wherein the one or more processors are further configured to cause the UE to:
receive, in a first cell, an indication of a mapping between the identifier and the uplink resource; and
wherein the one or more processors, to receive the simplified SSB in the cell, are configured to cause the UE to:
receive the simplified SSB in a second cell.

7. The apparatus of claim 6,
wherein the one or more processors, to receive the indication of the mapping in the first cell, are configured to cause the UE to:
receive the indication of the mapping in a radio resource control (RRC) communication when the apparatus is in one of an idle mode or an inactive mode in the first cell.

8. The apparatus of claim 6,
wherein the one or more processors, to receive the indication of the mapping in the first cell, are configured to cause the UE to:
receive the indication of the mapping in a medium access control (MAC) control element (MAC-CE) communication when the apparatus is in a radio resource control (RRC) connected mode in the first cell.

9. The apparatus of claim 6,
wherein the one or more processors, to receive the indication of the mapping in the first cell, are configured to cause the UE to:
receive the indication of the mapping in system information when the apparatus is in one of an idle mode or an inactive mode in the first cell.

10. The apparatus of claim 6,
wherein the one or more processors, to receive the indication of the mapping in the first cell, are configured to cause the UE to:
receive the indication of the mapping in dedicated radio resource control (RRC) signaling when the apparatus is in a radio resource control (RRC) connected mode in the first cell.

11. The apparatus of claim 1,
wherein the one or more processors are further configured to cause the UE to:
receive an indication of a mapping table that includes a mapping between a primary synchronization signal (PSS) identifier and the uplink resource.

12. The apparatus of claim 1,
wherein the one or more processors are further configured to cause the UE to:

receive, in a system information block (SIB), an indication of a mapping table that includes a mapping between a cell identifier and the uplink resource.

13. The apparatus of claim 1,
wherein the uplink resource is indicated in a configuration; and
wherein the configuration comprises at least one of:
a first indication of a time domain allocation for the uplink resource,
a second indication of a frequency domain allocation for the uplink resource,
a third indication of a spatial domain allocation for the uplink resource, or
a fourth indication of a power allocation for the uplink resource.

14. The apparatus of claim 1,
wherein the one or more processors are further configured to cause the UE to:
identify the uplink resource in a configuration that is included in a plurality of configurations preconfigured for the apparatus.

15. An apparatus for wireless communication at a network node, comprising:
one or more memories; and
one or more processors coupled to the one or more memories, the one or more processors configured to cause the network node to:
provide a simplified synchronization signal block (SSB) for a cell; and
obtain an uplink communication via an uplink resource for initial access or uplink wake-up signal transmission in the cell, wherein the uplink resource is identified by an identifier indicated by the simplified SSB.

16. The apparatus of claim 15,
wherein the simplified SSB comprises only a primary synchronization signal (PSS); and
wherein the identifier comprises a PSS identifier associated with the PSS.

17. The apparatus of claim 15,
wherein the simplified SSB comprises only a primary synchronization signal (PSS) and a secondary synchronization signal (SSS); and
wherein the identifier comprises a cell identifier associated with the apparatus.

18. The apparatus of claim 15,
wherein the uplink communication comprises at least one of:
an uplink wake-up signal (WUS), or
a random access channel (RACH) transmission.

19. The apparatus of claim 15,
wherein the one or more processors are configured to cause the network node to:
provide, in a radio resource control (RRC) reconfiguration complete communication, an indication of a mapping between the identifier and the uplink resource.

20. The apparatus of claim 15,
wherein the one or more processors are further configured to cause the network node to:
provide, in a radio resource control (RRC) reestablishment complete communication, an indication of a mapping between the identifier and the uplink resource.

21. An apparatus for wireless communication at a first network node, comprising:
one or more memories; and
one or more processors coupled to the one or more memories, the one or more processors configured to cause the first network node to:
configure a downlink transmission to include an indication of a mapping between an identifier associated with a second network node and an uplink resource configured for initial access or uplink wake-up signal transmission in a cell of the first network node; and
provide the downlink transmission via the cell of the first network node.

22. The apparatus of claim 21,
wherein the identifier comprises a primary synchronization signal (PSS) identifier associated with the second network node.

23. The apparatus of claim 21,
wherein the identifier comprises a cell identifier associated with the second network node.

24. The apparatus of claim 21,
wherein the uplink resource comprises at least one of:
an uplink wake-up signal (WUS) resource, or
a random access channel (RACH) transmission resource.

25. The apparatus of claim 21,
wherein the uplink resource is indicated in a configuration in the downlink transmission; and
wherein the configuration comprises at least one of:
a first indication of a time domain allocation for the uplink resource,
a second indication of a frequency domain allocation for the uplink resource,
a third indication of a spatial domain allocation for the uplink resource, or
a fourth indication of a power allocation for the uplink resource.

26. A method of wireless communication performed by an apparatus, comprising:
receiving a simplified synchronization signal block (SSB) in a cell; and
transmitting an uplink communication via an uplink resource for initial access or uplink wake-up signal transmission in the cell, the uplink resource being identified by an identifier indicated by the simplified SSB.

27. The method of claim 26,
wherein the simplified SSB comprises only a primary synchronization signal (PSS); and
wherein the identifier comprises a PSS identifier associated with the PSS.

28. The method of claim 26,
wherein the simplified SSB comprises only a primary synchronization signal (PSS) and a secondary synchronization signal (SSS); and
wherein the identifier comprises a cell identifier of a network node that is associated with the simplified SSB.

29. The method of claim 26,
wherein the uplink communication comprises at least one of:
an uplink wake-up signal (WUS), or
a random access channel (RACH) transmission.

30. The method of claim 26, further comprising:
identifying the uplink resource based at least in part on a mapping between the identifier and the uplink resource.

31. A method of wireless communication performed by an apparatus, comprising:
providing a simplified synchronization signal block (SSB) for a cell; and obtaining an uplink communication via an uplink resource for initial access or uplink wake-up signal transmission in the cell, the uplink resource being identified by an identifier indicated by the simplified SSB.

32. The method of claim 31, wherein:

the simplified SSB comprises only a primary synchronization signal (PSS); or the simplified SSB comprises only the PSS and a secondary synchronization signal (SSS).

33. The method of claim 31, further comprising:

providing, in one of a radio resource control (RRC) reconfiguration complete communication or an RRC reestablishment complete communication, an indication of a mapping between the identifier and the uplink resource.

34. A method of wireless communication performed by a first apparatus, comprising:

configuring a downlink transmission to include an indication of a mapping between an identifier associated with a second apparatus and an uplink resource configured for initial access or uplink wake-up signal transmission in a cell of the first apparatus; and providing the downlink transmission via the cell of the first apparatus.

35. The method of claim 34, wherein the identifier comprises a primary synchronization signal (PSS) identifier or a cell identifier associated with the second apparatus.

36. The method of claim 34, wherein the uplink resource is indicated in a configuration in the downlink transmission; and wherein the configuration comprises at least one of:

a first indication of a time domain allocation for the uplink resource, a second indication of a frequency domain allocation for the uplink resource, a third indication of a spatial domain allocation for the uplink resource, or a fourth indication of a power allocation for the uplink resource.

* * * * *